United States Patent
Orange et al.

(10) Patent No.: US 10,850,493 B2
(45) Date of Patent: Dec. 1, 2020

(54) APPARATUS FOR THREE-DIMENSIONALLY PRINTING REACTIVE MATERIALS

(71) Applicant: The ExOne Company, North Huntingdon, PA (US)

(72) Inventors: Michael J. Orange, Latrobe, PA (US); Rick D. Lucas, Belmont, OH (US); Kimberly E. Kanzler, West Babylon, NY (US); Travis Maxwell Inks, Greensburg, PA (US)

(73) Assignee: The ExOne Company, North Huntingdon, PA (US)

(*) Notice: Subject to any disclaimer, the term of this patent is extended or adjusted under 35 U.S.C. 154(b) by 701 days.

(21) Appl. No.: 14/829,757

(22) Filed: Aug. 19, 2015

(65) Prior Publication Data

US 2016/0052054 A1 Feb. 25, 2016

Related U.S. Application Data

(60) Provisional application No. 62/039,173, filed on Aug. 19, 2014.

(51) Int. Cl.
| | |
|---|---|
| *B29C 67/00* | (2017.01) |
| *B33Y 30/00* | (2015.01) |
| *B22F 3/00* | (2006.01) |
| *B29C 64/165* | (2017.01) |
| *B29C 64/25* | (2017.01) |
| *B29C 64/371* | (2017.01) |
| *B29C 64/379* | (2017.01) |

(52) U.S. Cl.
CPC .............. *B33Y 30/00* (2014.12); *B22F 3/003* (2013.01); *B22F 3/008* (2013.01); *B29C 64/165* (2017.08); *B29C 64/25* (2017.08); *B29C 64/371* (2017.08); *B29C 64/379* (2017.08); *B22F 2999/00* (2013.01)

(58) Field of Classification Search
CPC ........ B29C 64/165; B29C 64/20; B33Y 30/00
USPC ........................................................ 425/375
See application file for complete search history.

(56) References Cited

U.S. PATENT DOCUMENTS

| | | | | |
|---|---|---|---|---|
| 7,887,316 | B2* | 2/2011 | Cox | B29C 64/153 425/375 |
| 8,753,105 | B2* | 6/2014 | Scott | B22F 3/1055 425/338 |
| 8,794,263 | B2* | 8/2014 | Scott | B29C 67/0085 700/119 |
| 2007/0057412 | A1* | 3/2007 | Weiskopf | B29C 64/153 425/375 |

(Continued)

*Primary Examiner* — Joseph S Del Sole
*Assistant Examiner* — Thu Khanh T Nguyen
(74) *Attorney, Agent, or Firm* — Philip D. Lane

(57) ABSTRACT

Apparatuses are disclosed for three-dimensionally printing reactive materials which utilize a powder spreading step followed by a binder-jet deposition step. Some such apparatuses include a binder jet three-dimensional printing device, a curing device, and a depowdering device contained within an environmental enclosure which provides an inert atmosphere sufficient to allow a reactive material to be used as a build material without fire or explosion hazards. Some such apparatuses include one or more conveying systems for moving a removable build box among the various devices. Environmental enclosures having unique designs and features are disclosed.

5 Claims, 35 Drawing Sheets

(56) References Cited

U.S. PATENT DOCUMENTS

2010/0228381 A1* 9/2010 Matsui ............... B29C 64/165
  700/120
2013/0108726 A1* 5/2013 Uckelmann ......... B29C 67/0007
  425/174.4

* cited by examiner

ExOne

Build Volume:
15.5 x 9.5 x 9.5 in.
394 x 241 x 241 mm

Layer Thickness:
100 or 180 microns

Accuracy:
+/- 0.5%

APPARATUS FOR THREE-DIMENSIONALLY PRINTING REACTIVE MATERIALS

BACKGROUND

Field of the Invention

The invention relates to apparatuses for three-dimensionally printing reactive materials which utilize a powder spreading step followed by a binder-jet deposition step.

Background of the Invention

Three dimensional printing was developed in the 1990's at the Massachusetts Institute of Technology and is described in several United States patents, including the following United States patents: U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al. In essence, three-dimensional printing involves the spreading of a layer of particulate material and then selectively jet-printing a fluid onto that layer to cause selected portions of the particulate layer to bind together. This sequence is repeated for additional layers until the desired article has been constructed. The material making up the particulate layer is often referred as the "build material" and the jetted fluid is often referred to as a "binder", or in some cases, an "activator"; the term "binder" will be used herein to refer to all types of jetted fluids used in three-dimensional printing. Post-processing of the three-dimensionally printed article is often required in order to strengthen and/or densify the article.

The powder layer thickness determines the resolution of the article in the vertical direction—also known as the "z-direction" or the "build direction"—and so it is desirable to set the powder layer thickness to be as thin as possible. On the other hand, the number of powder layers that need to be deposited and printed upon to make an article determines the number of powder deposition/printing cycles and therefore the amount of time to print the article. Thus, there is also an incentive to make the powder layer thickness as great as possible to minimize the time necessary to make the article. The powder layer thickness is therefore determined by balancing resolution and print time. Typically, the selected print layer thickness is within the range of a few tens of microns to a few hundreds of microns. Thus, hundreds to thousands of powder deposition/print cycles typically are required to make an article or set of articles.

There has been a problem in the art that reactive materials are dangerous to use a build materials in the three-dimensional printing process because they may ignite during processing. Also, dust clouds comprising reactive materials may explode. The present invention provides solutions to this on-going problem in the art.

SUMMARY OF THE INVENTION

The present invention provides apparatuses for three-dimensionally printing reactive materials which utilize a powder spreading step followed by a binder-jet deposition step. Embodiments of the present invention include a binder jet three-dimensional printing device, a curing device, and a depowdering device contained within an environmental enclosure which provides an inert atmosphere sufficient to allow a reactive material to be used as a build material without fire or explosion hazards.

Some embodiments further include one or more conveying systems for moving a removable build box among the various devices.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1:
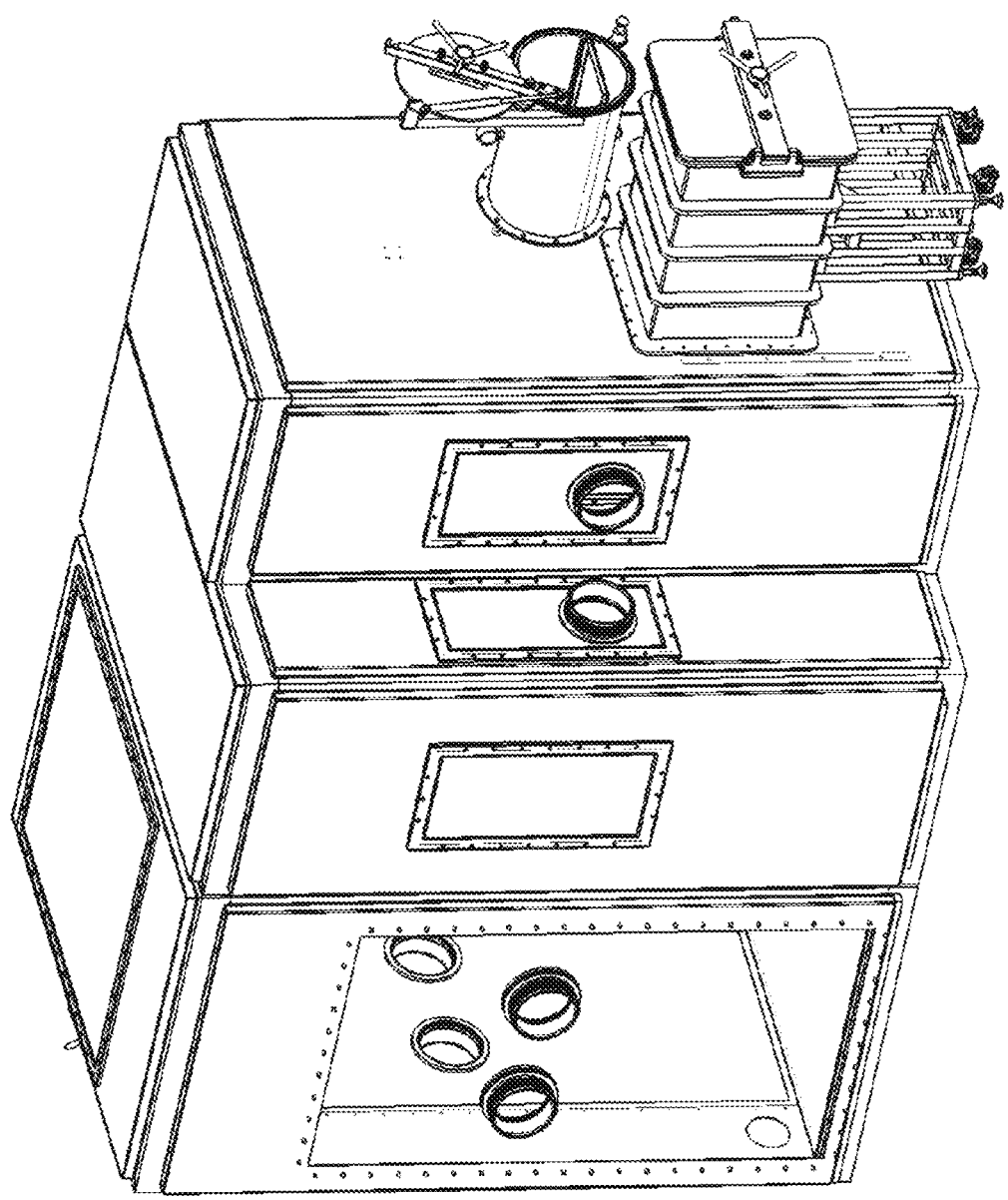
FIG. 1 is a schematic perspective front view of an environmental enclosure sans gloves according to an embodiment of the present invention.
Figure 2:
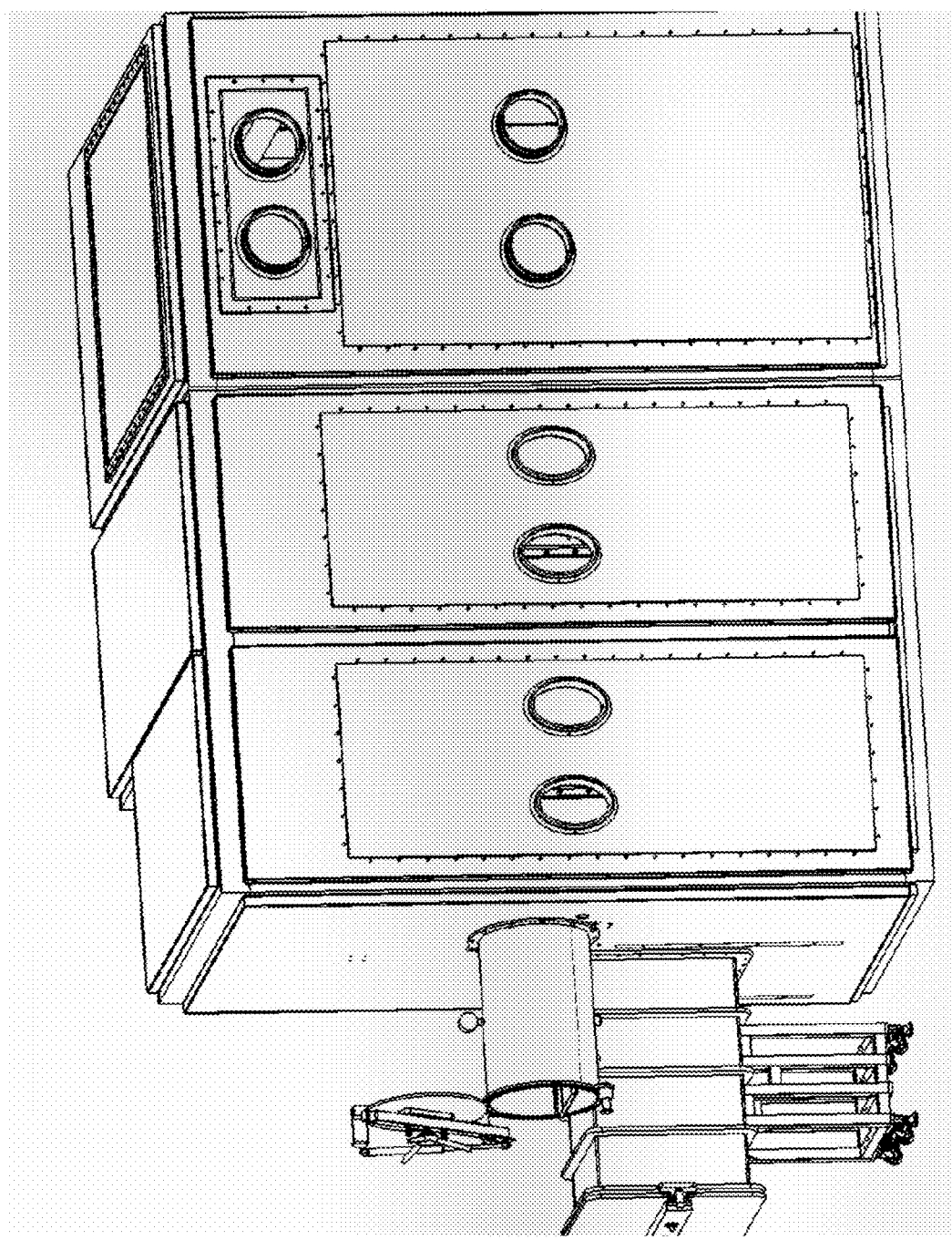
FIG. 2 is a schematic perspective rear view of the environmental enclosure of FIG. 1.
Figure 3:
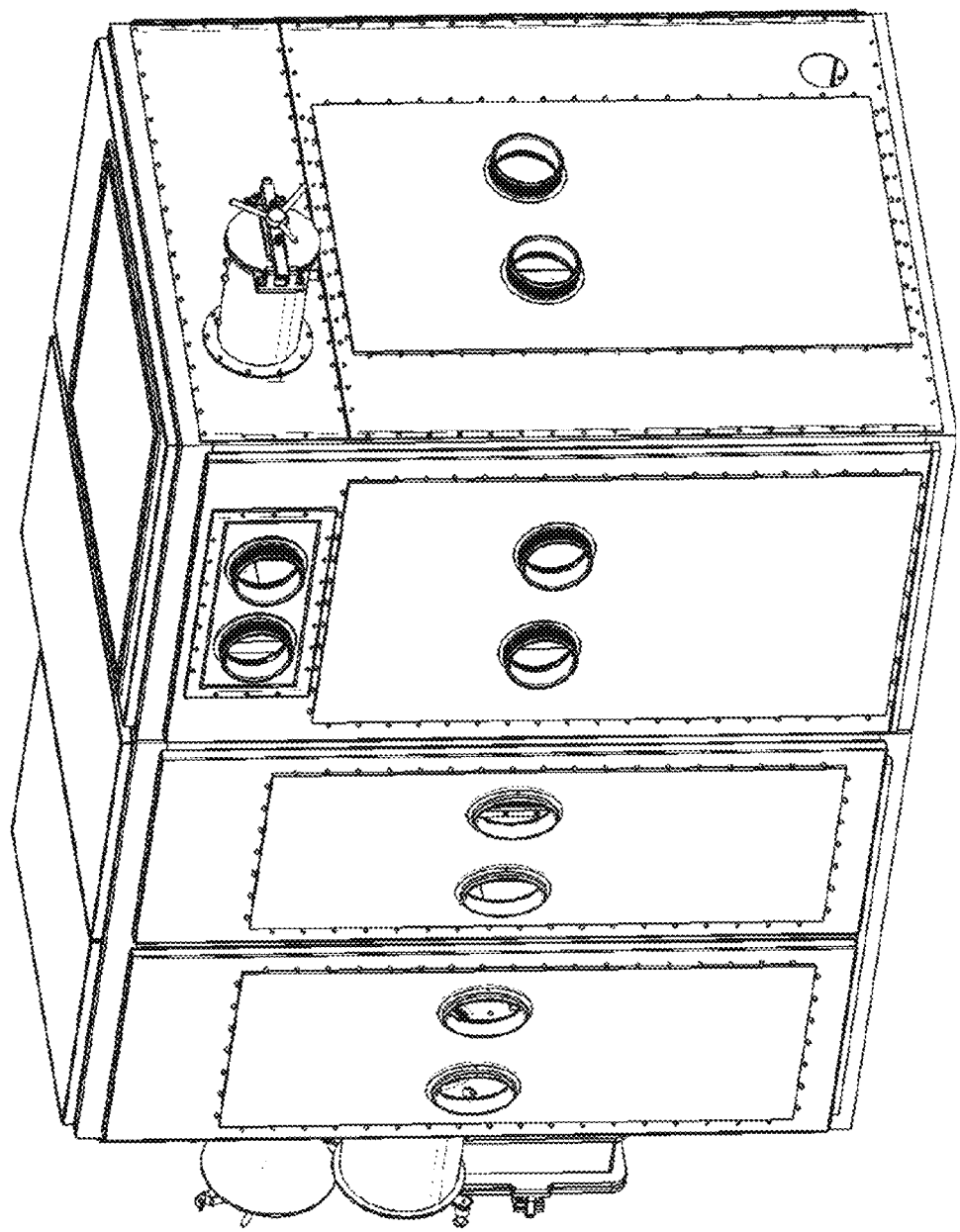
FIG. 3 is another schematic perspective rear view of the environmental enclosure of FIG. 1.
Figure 4:
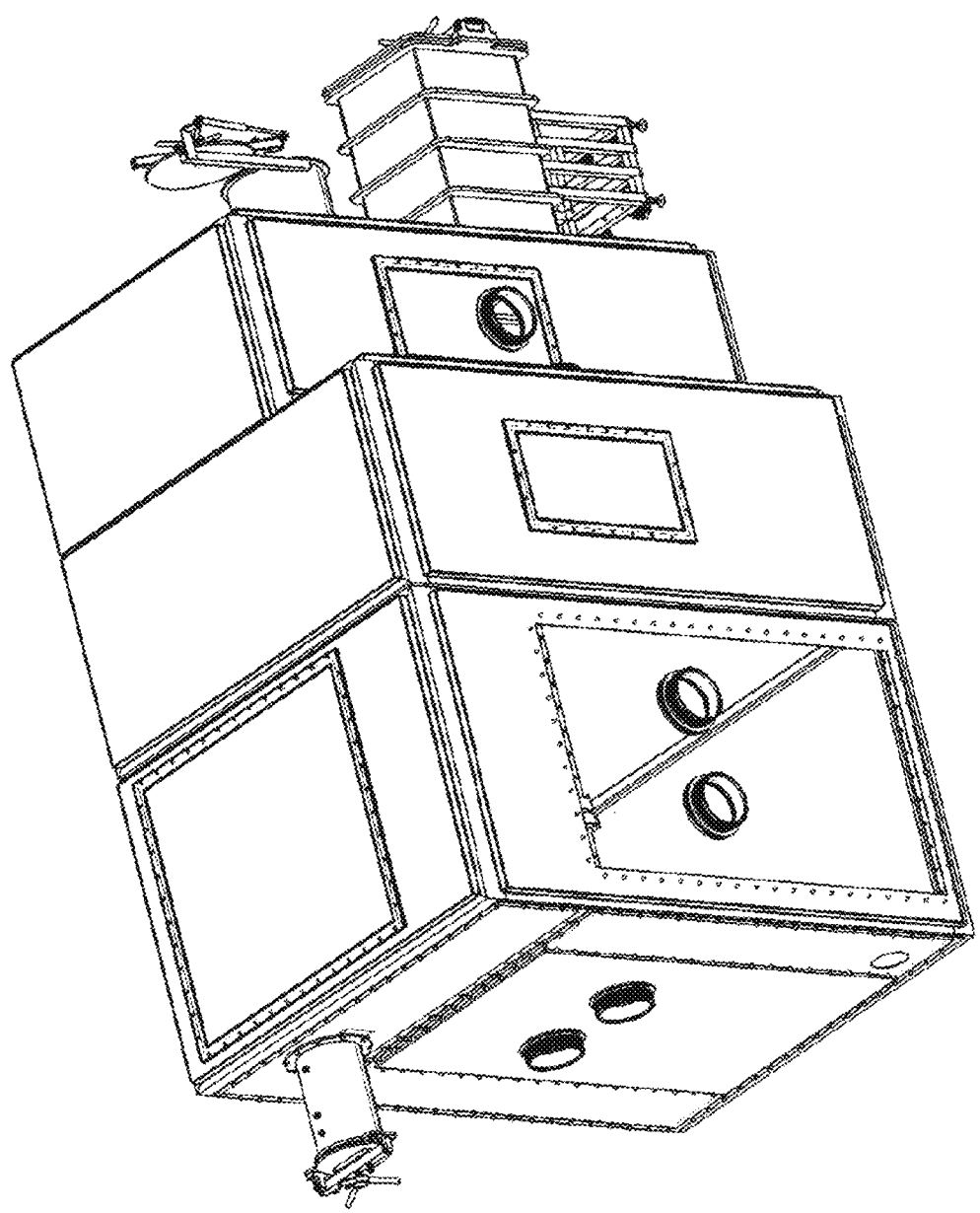
FIG. 4 is a schematic perspective top and front view of the environmental enclosure of FIG. 1.
Figure 5:
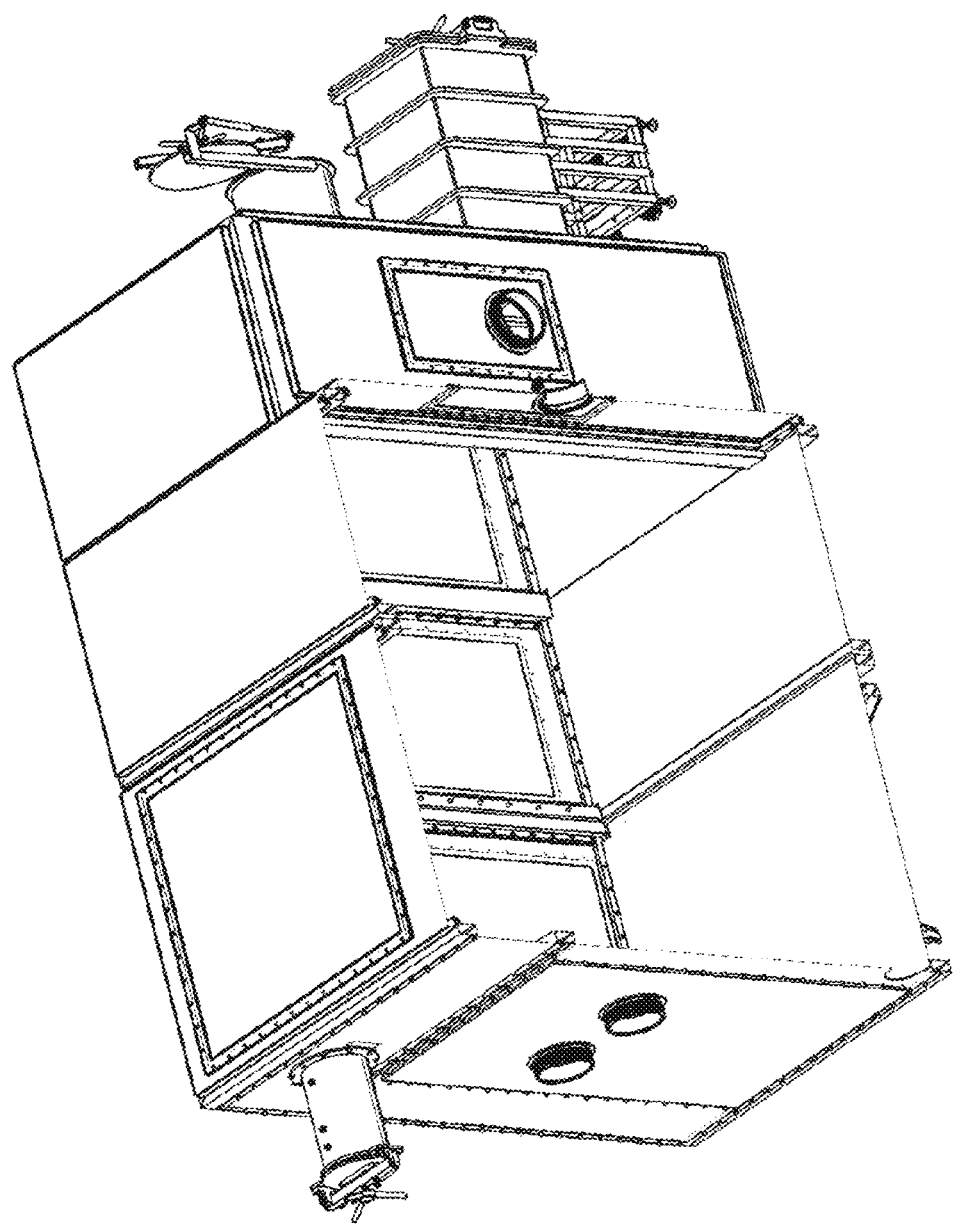
FIG. 5 is a partial cut-away view of the environmental enclosure of FIG. 4 with the cut being taken along the vertical centerline of a side glove port of the front extension portion of the environmental enclosure.
Figure 6:
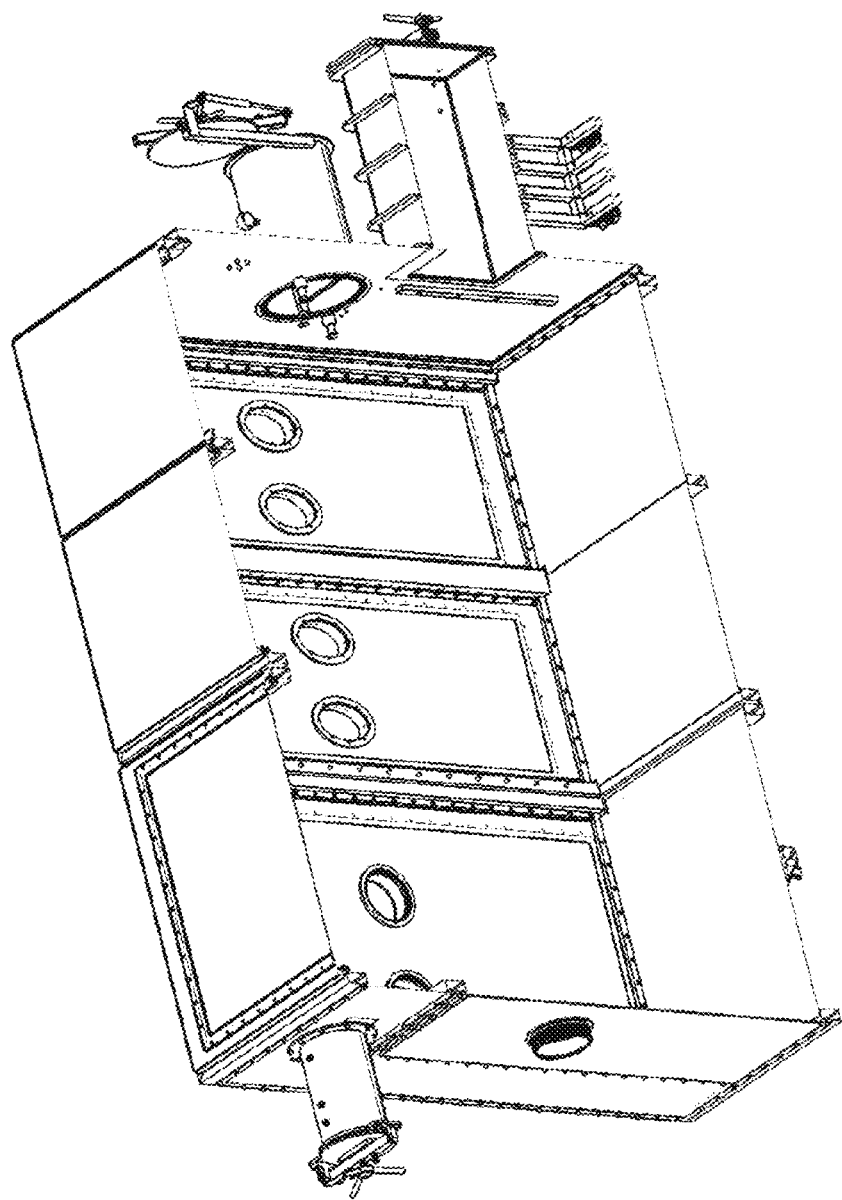
FIG. 6 is a partial cut-away view of the environmental enclosure of FIG. 4 with the cut being taken along the plane that cuts the vertical centerline of the interlock enclosure designed to accommodate a curing device.
Figure 7:
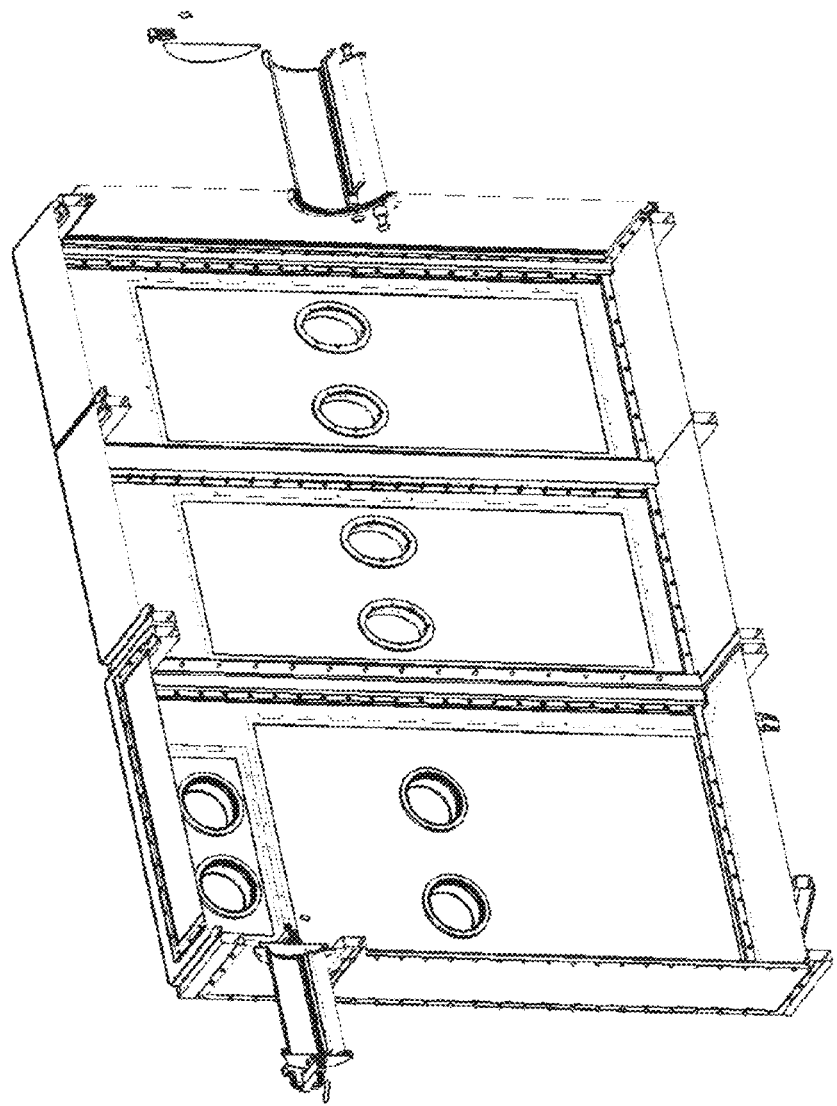
FIG. 7 is a partial cut-away view of the environmental enclosure of FIG. 4 with the cut being taken along the plane that cuts the vertical centerline of the left and right interlocks which are designed for transferring materials into and out of the environmental enclosure.
Figure 8:
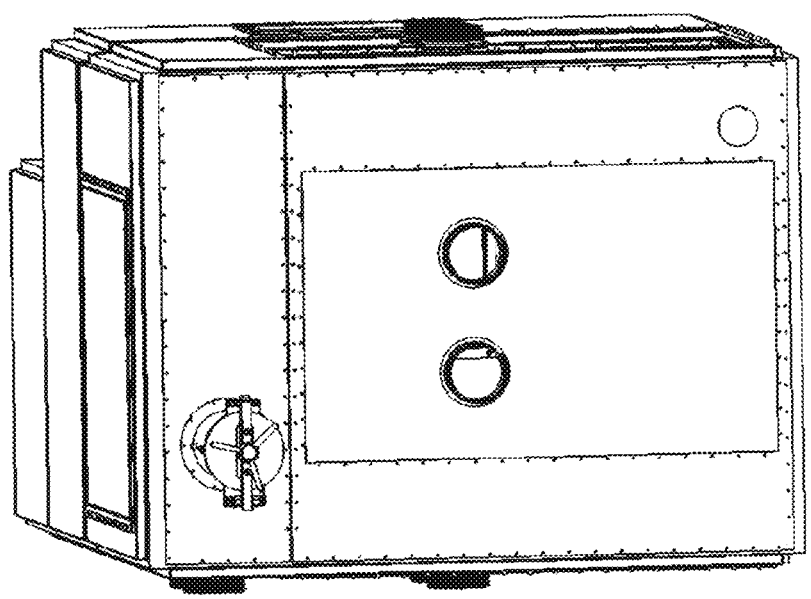
FIG. 8 is a schematic perspective top and left side view of the environmental enclosure of FIG. 1
Figure 9:
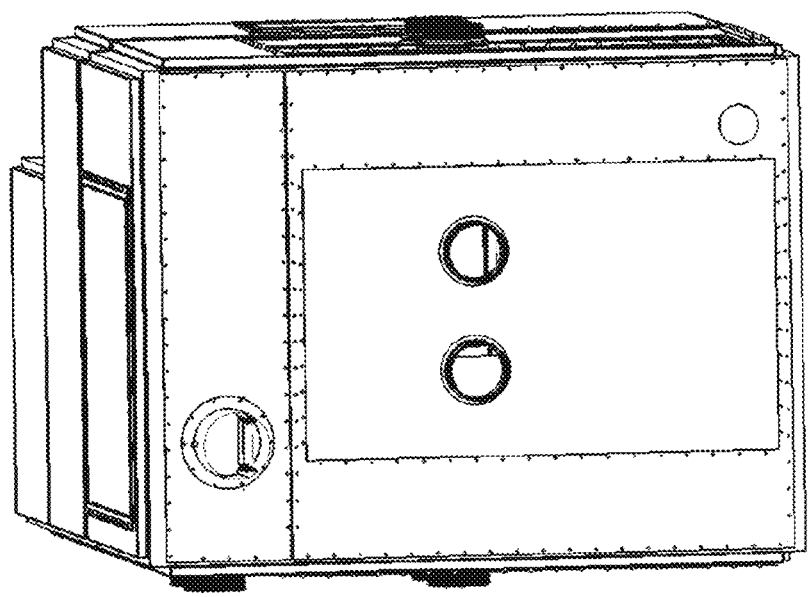
FIG. 9 is a partial cut-away view of the environmental enclosure of FIG. 8 with the cut being taken along the plane that cuts the longitudinal centerline of the left interlock.
Figure 10:
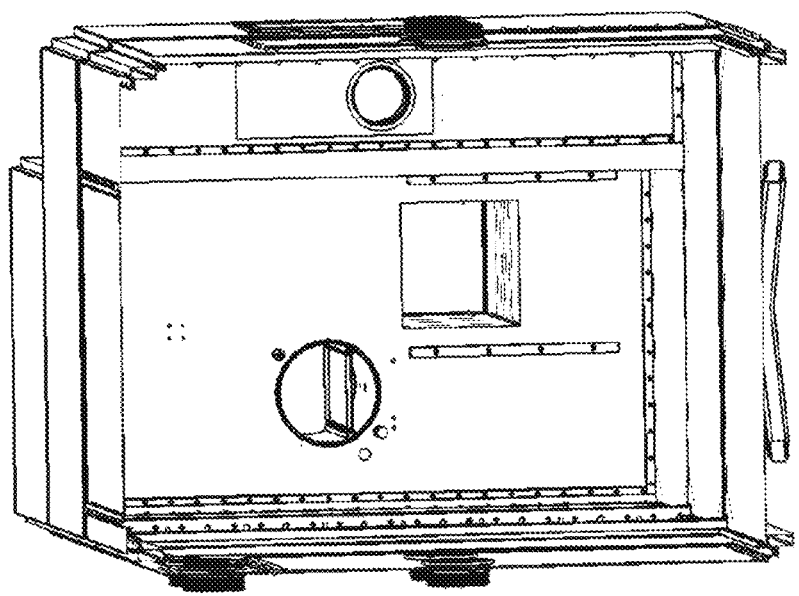
FIG. 10 is a partial cut-away view of the environmental enclosure of FIG. 8 with the cut being taken along the plane that cuts the centerline of the window in the roof of the environmental enclosure.
Figure 11:
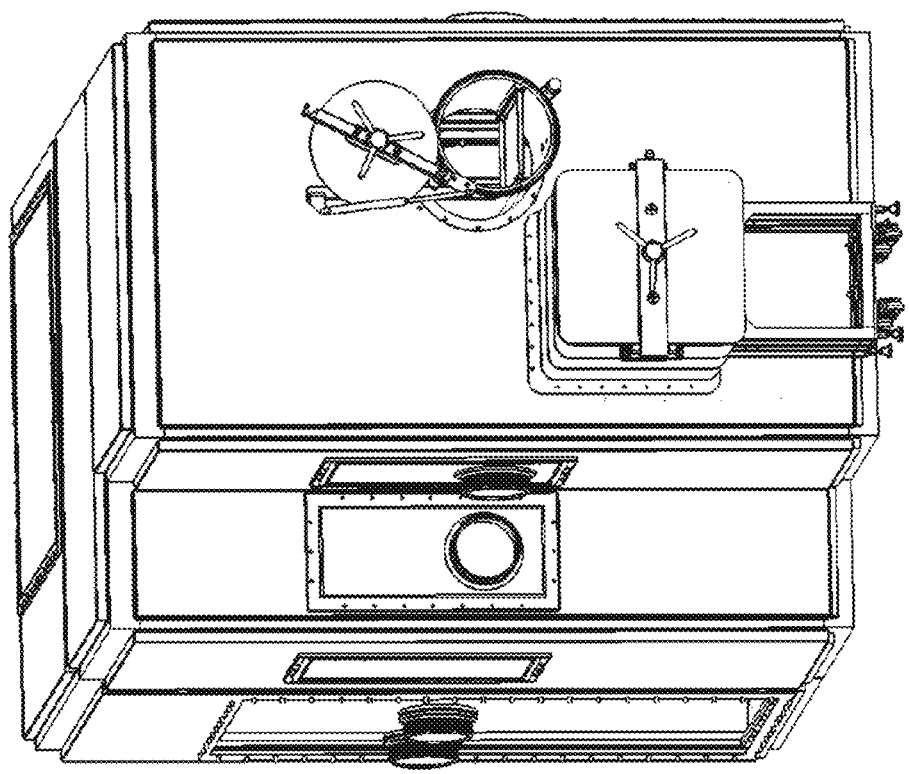
FIG. 11 is a schematic perspective top and right side view of the environmental enclosure of FIG. 1.
Figure 12:
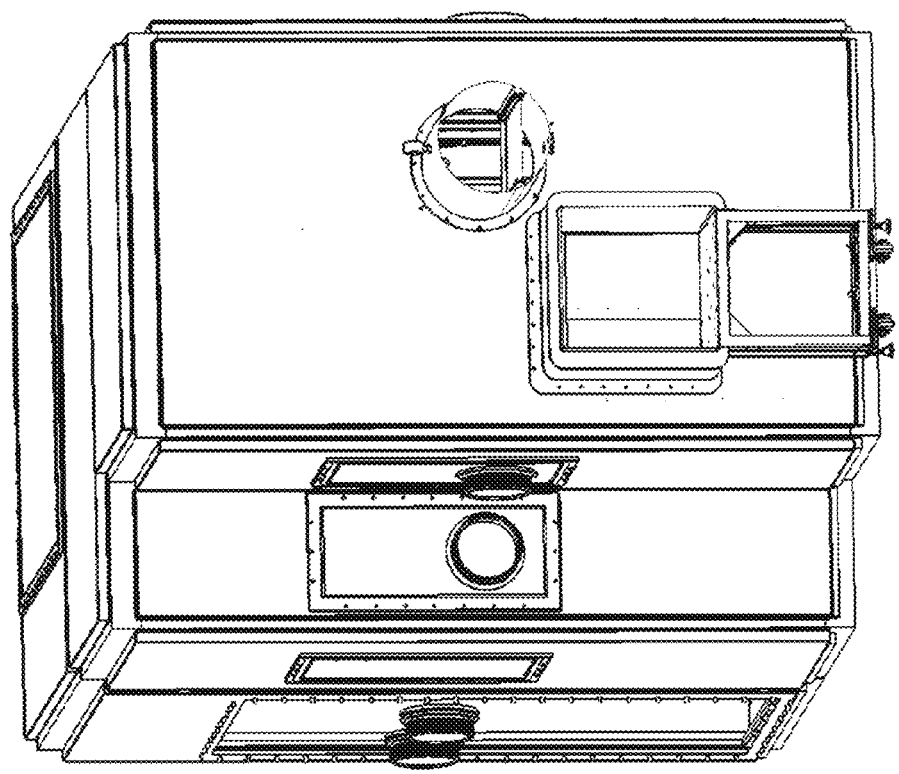
FIG. 12 is a partial cut-away view of the environmental enclosure of FIG. 11 with the cut being taken along a plane that cuts the interlock enclosure designed to accommodate a curing device and one of the interlocks which is designed for transferring materials into and out of the environmental enclosure.
Figure 13:
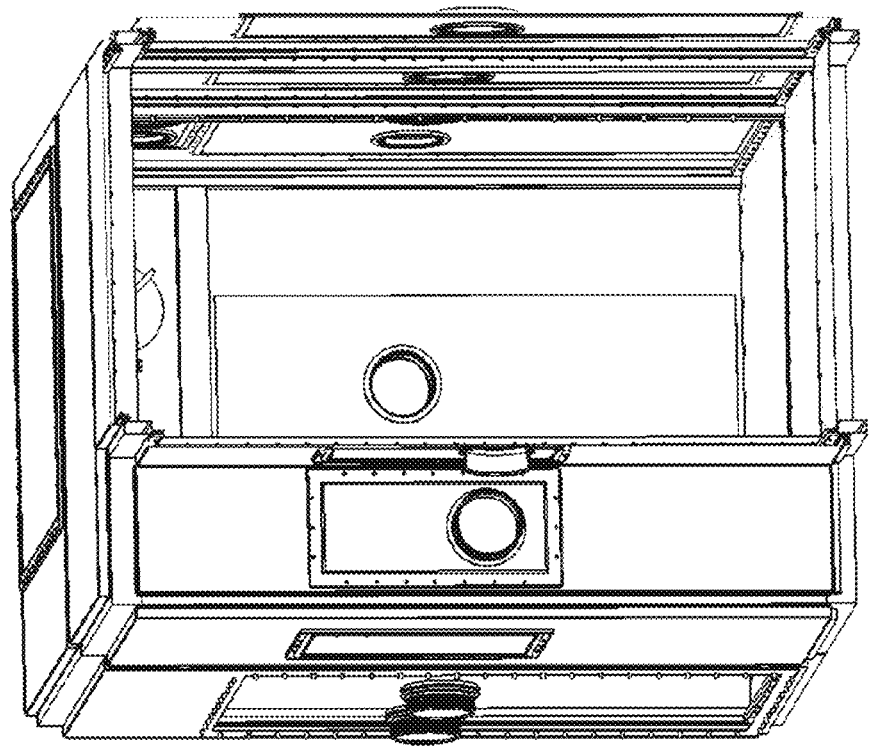
FIG. 13 is a partial cut-away view of the environmental enclosure of FIG. 11 with the cut being taken along the mid-plane of one of the glove ports.
Figure 14:
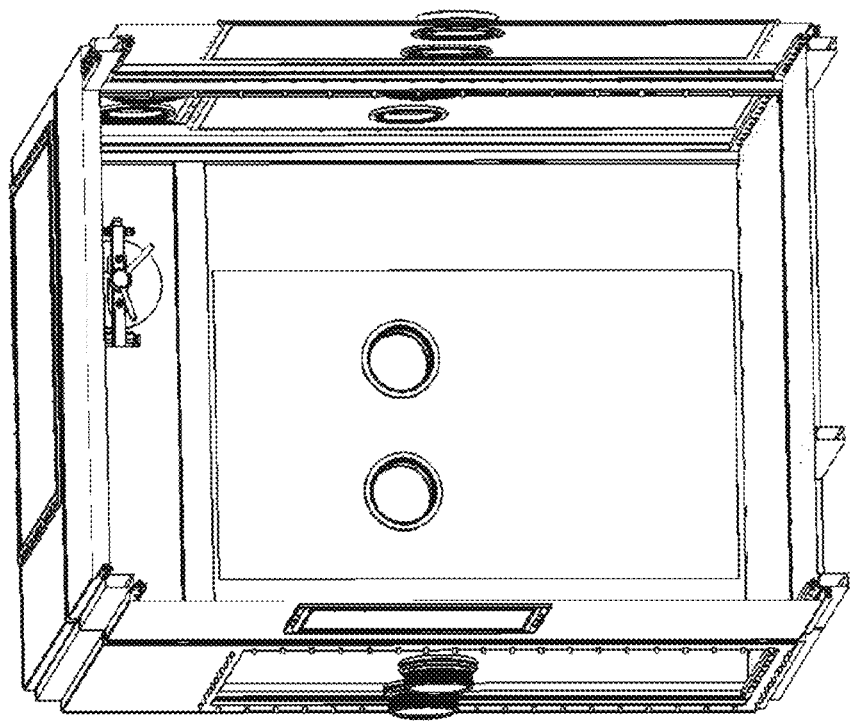
FIG. 14 is a partial cut-away view of the environmental enclosure of FIG. 11 with the cut being taken along a plane that cuts the front extension just to the right of its small front window.
Figure 15:
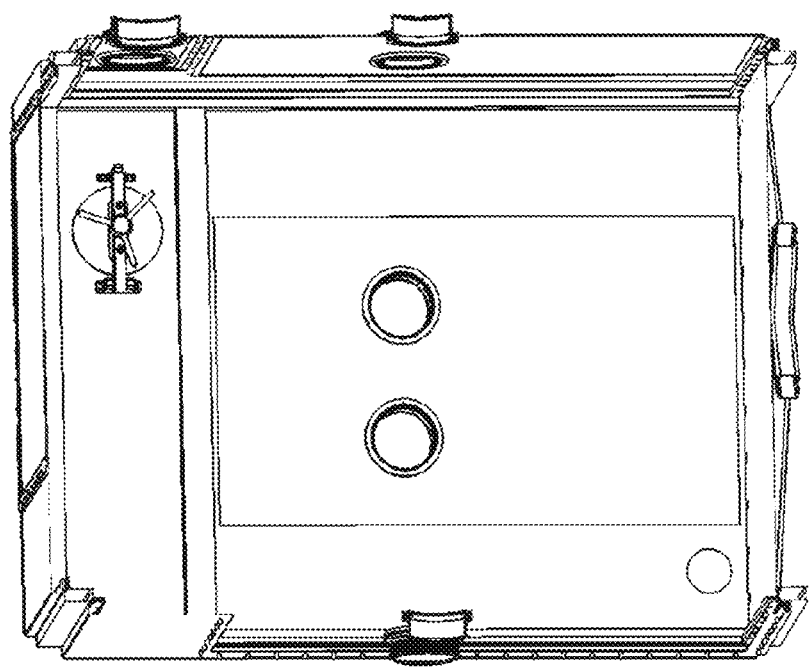
FIG. 15 is a partial cut-away view of the environmental enclosure of FIG. 11 with the cut being taken along a plane that cuts through the right glove port on the front extension.
Figure 16:
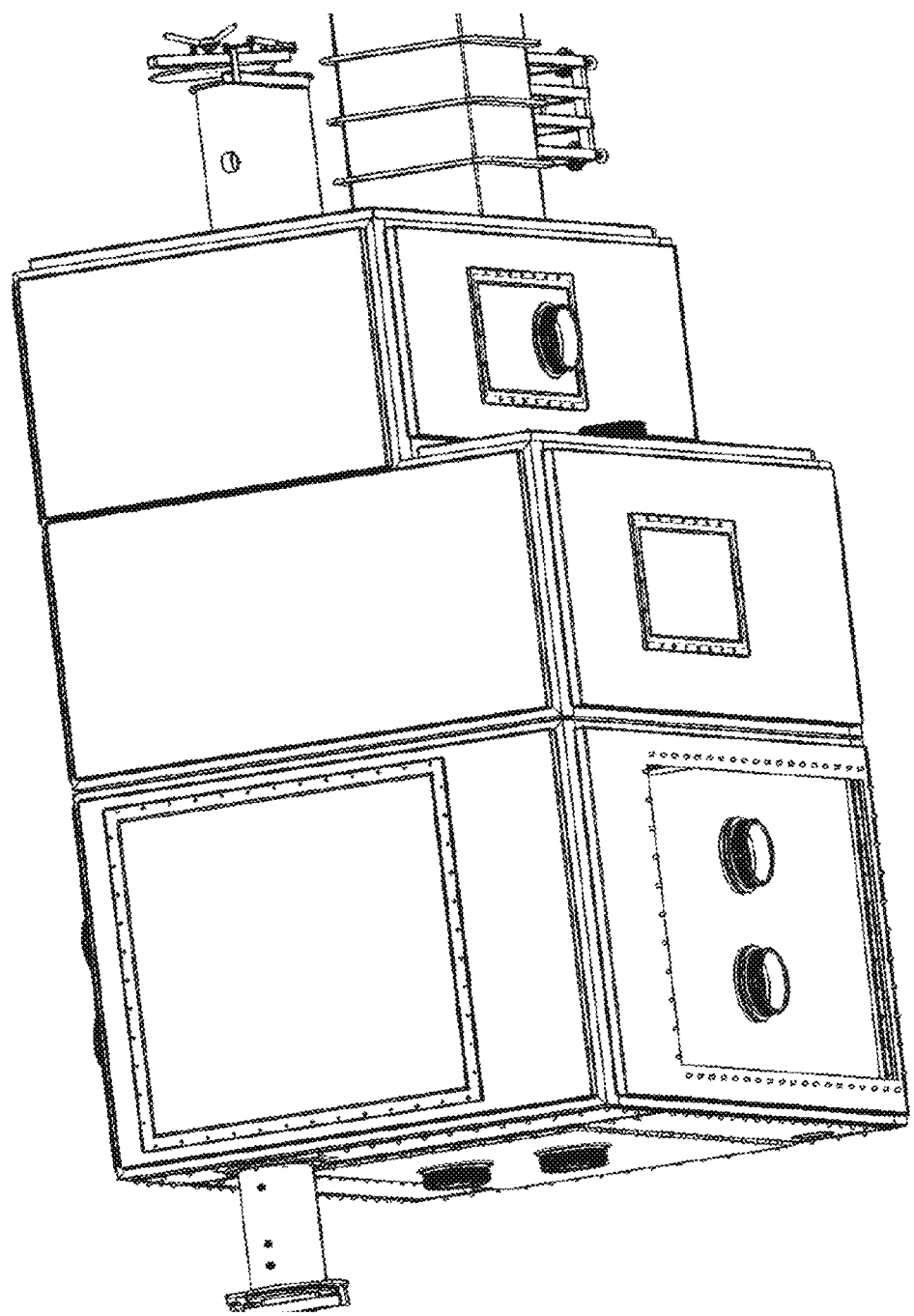
FIG. 16 is a schematic top view of the environmental enclosure of FIG. 1.
Figure 17:
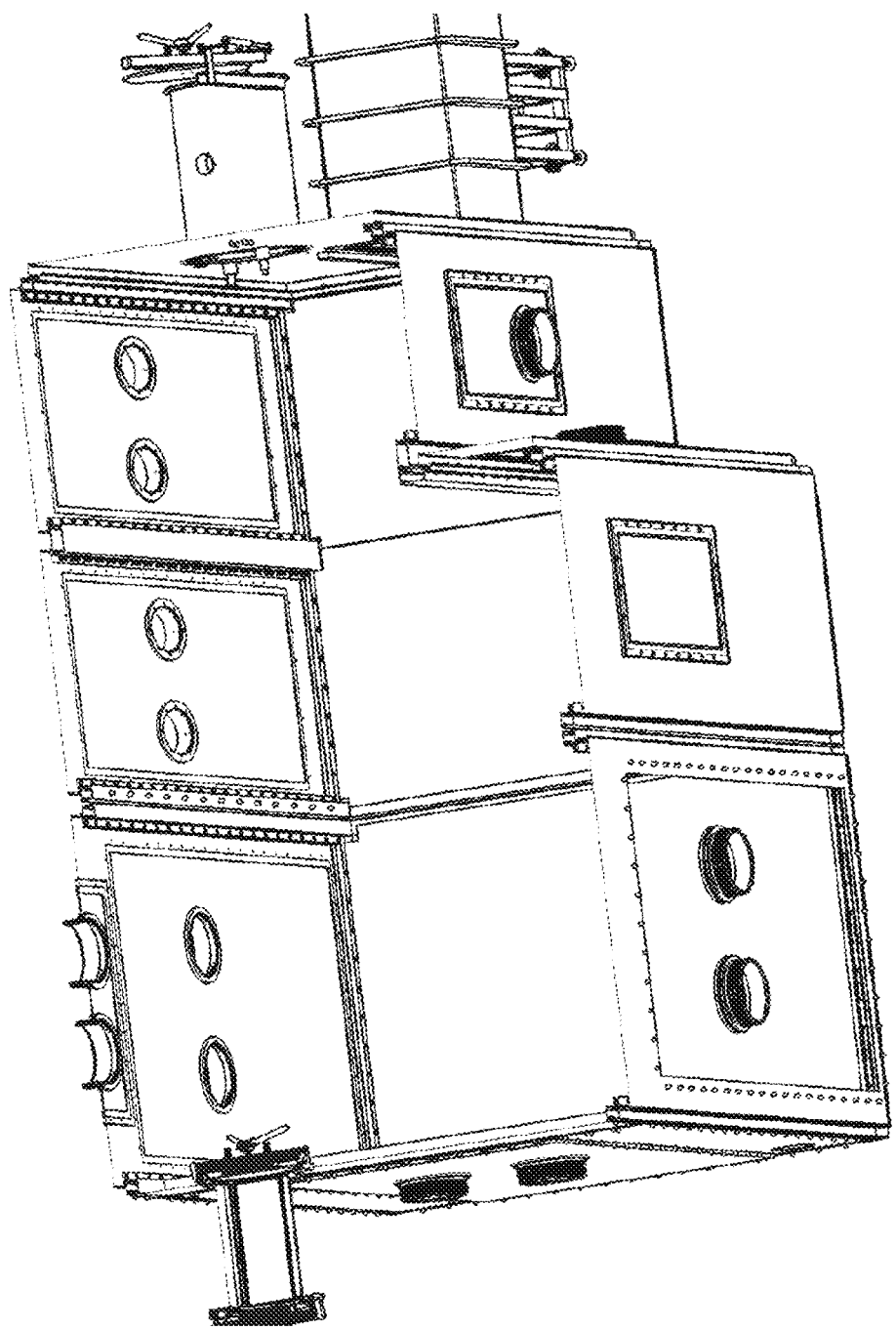
FIG. 17 is a partial cut-away view of the environmental enclosure of FIG. 16 with the cut being taken along a mid-plane of the upper interlock which is designed for transferring materials into and out of the environmental enclosure.
Figure 18:
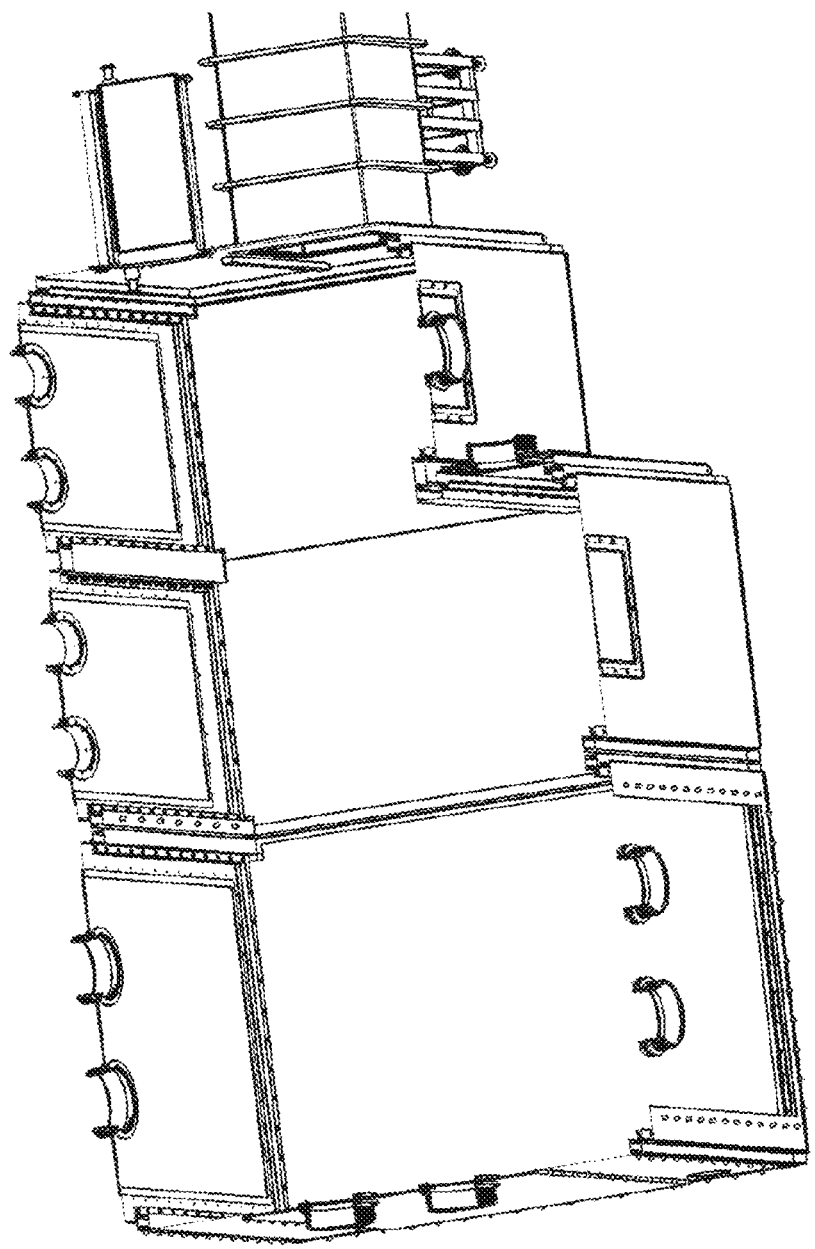
FIG. 18 is a partial cut-away view of the environmental enclosure of FIG. 16 with the cut being taken along a mid-plane of the glove ports.
Figure 19:
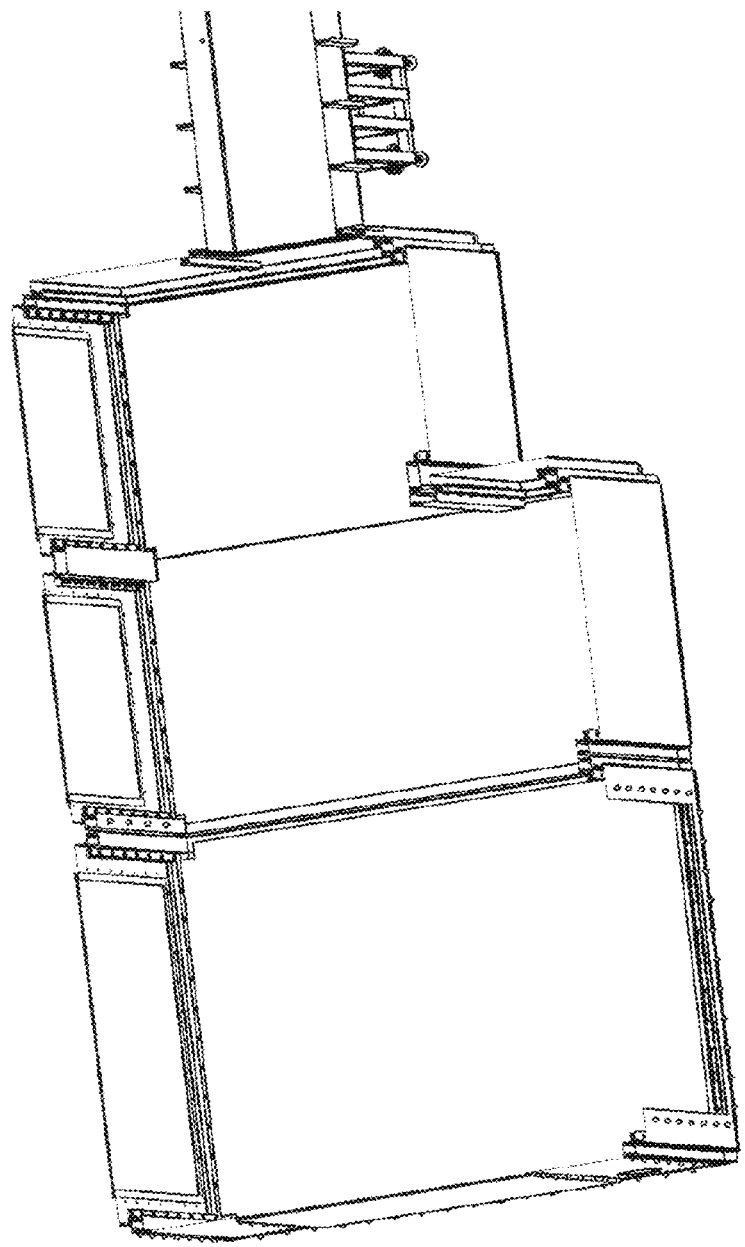
FIG. 19 is a partial cut-away view of the environmental enclosure of FIG. 16 with the cut being taken along a mid-plane of the interlock enclosure designed to accommodate a curing device.
Figure 20:
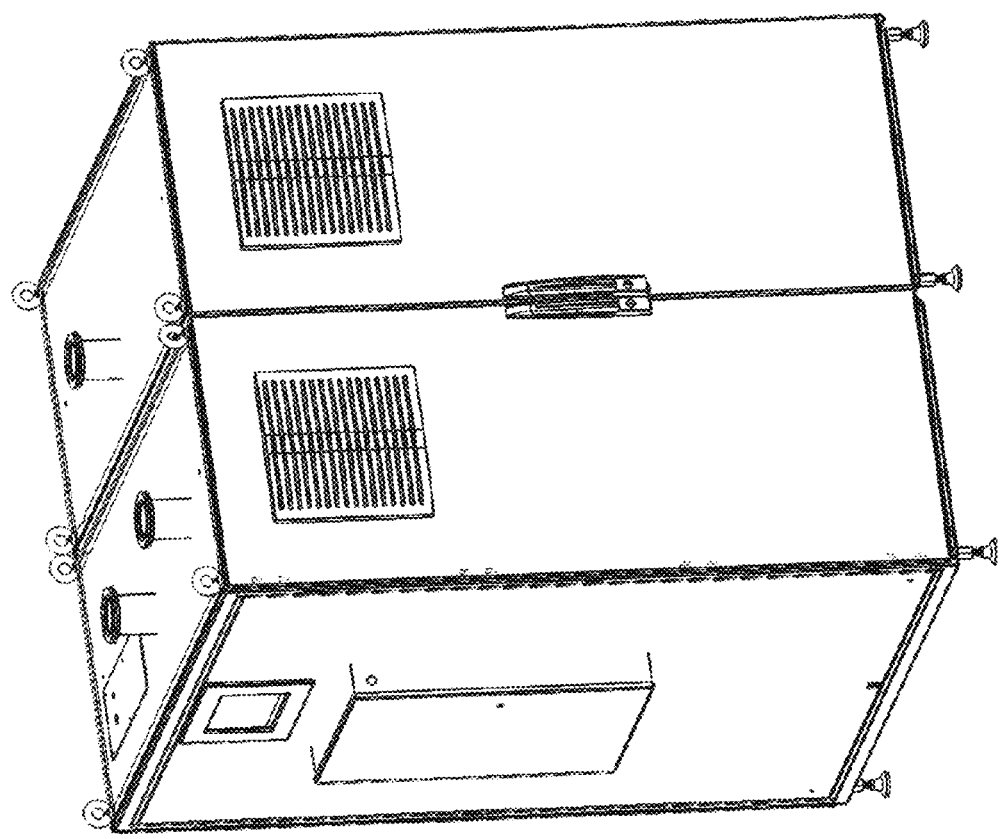
FIG. 20 is a schematic perspective front view of the enclosure for the gas purification and handling unit that is to be operably connected to the environmental enclosure of FIG. 1.
Figure 21:
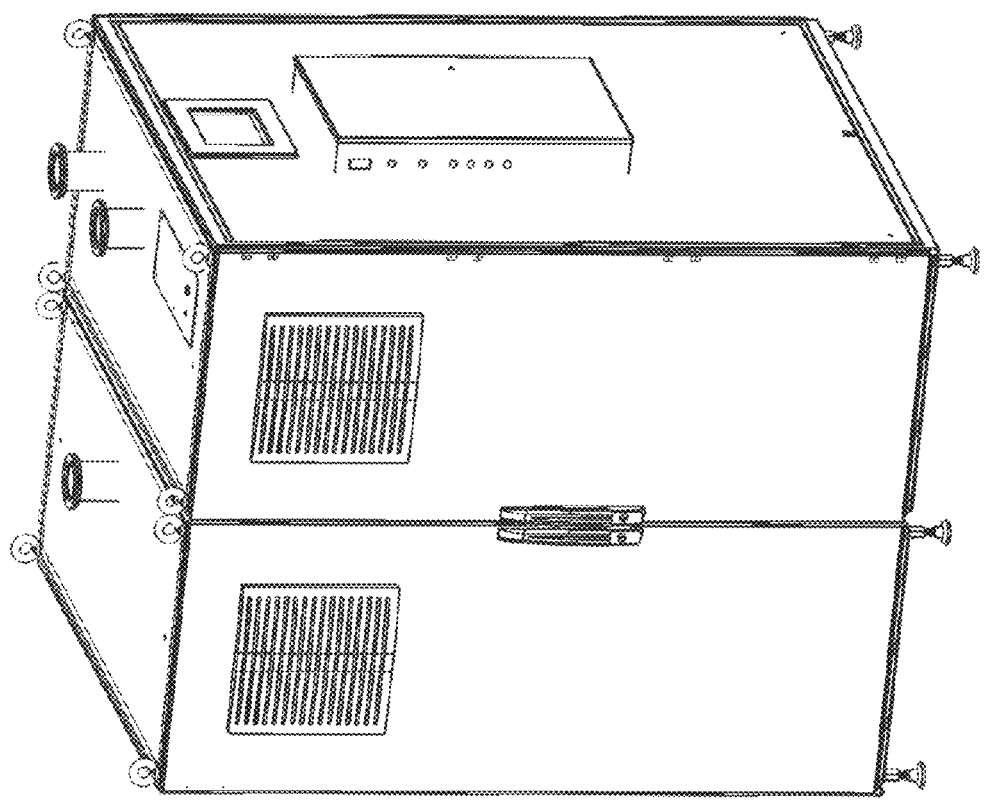
FIG. 21 is another schematic perspective front view of the enclosure for the gas purification and handling unit of FIG. 20.
Figure 22:
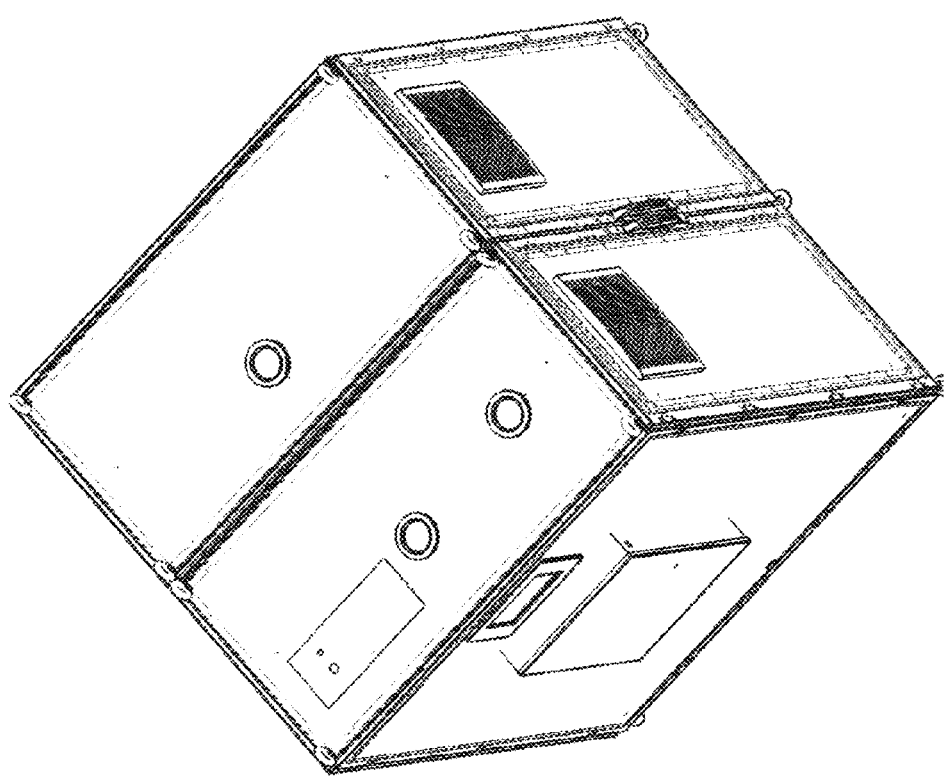
FIG. 22 is a schematic perspective top view of the enclosure for the gas purification and handling unit of FIG. 20.
Figure 23:
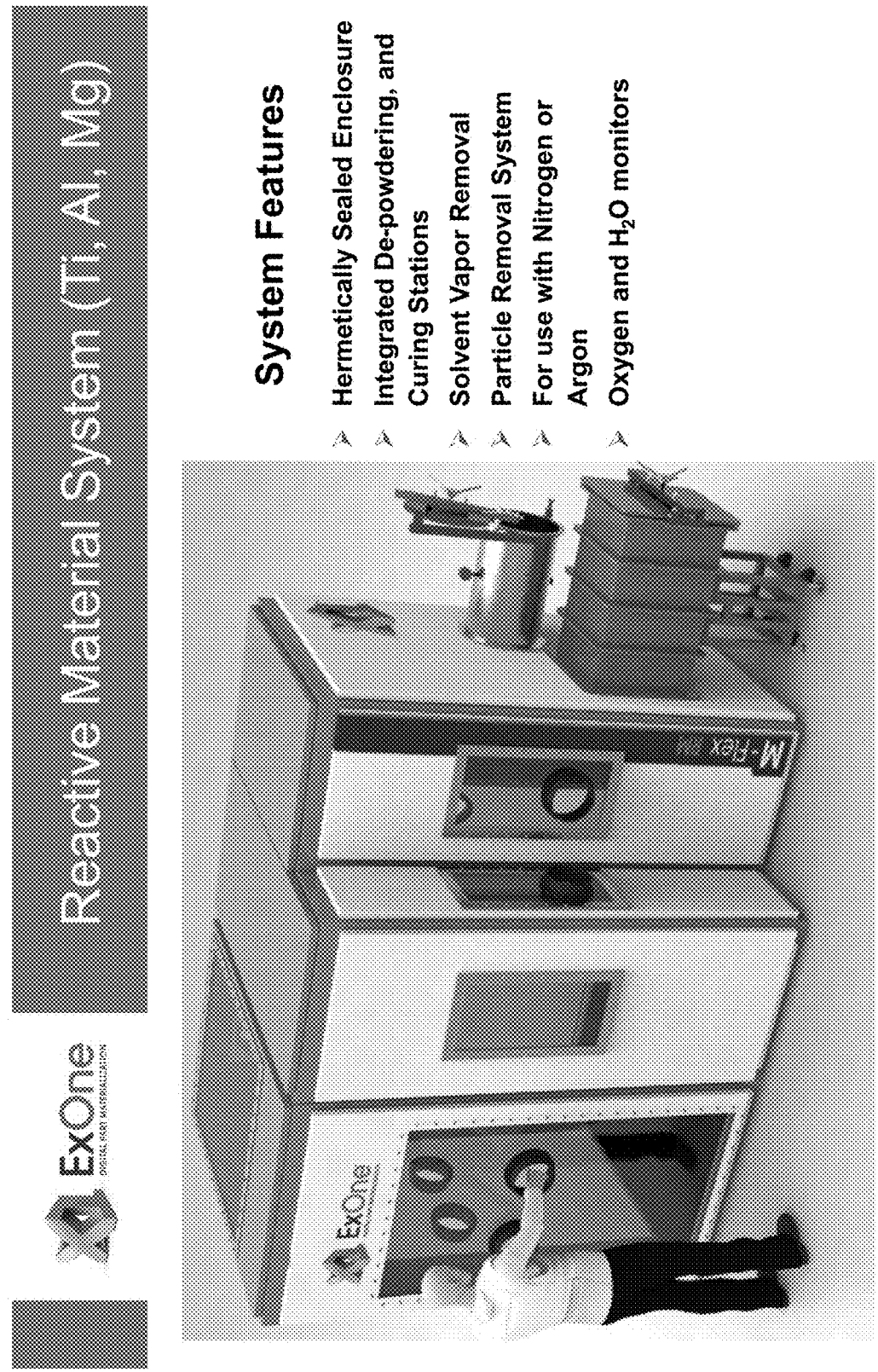
FIG. 23 is a schematic perspective front view of the environmental enclosure of FIG. 1 sans gloves showing an operator standing in front of the front extension. Also included in this drawing is information about an embodiment of the present invention apparatus for three-dimensionally printing reactive materials and the identification of examples of three such reactive materials, titanium, aluminum, and magnesium materials.
Figure 24:
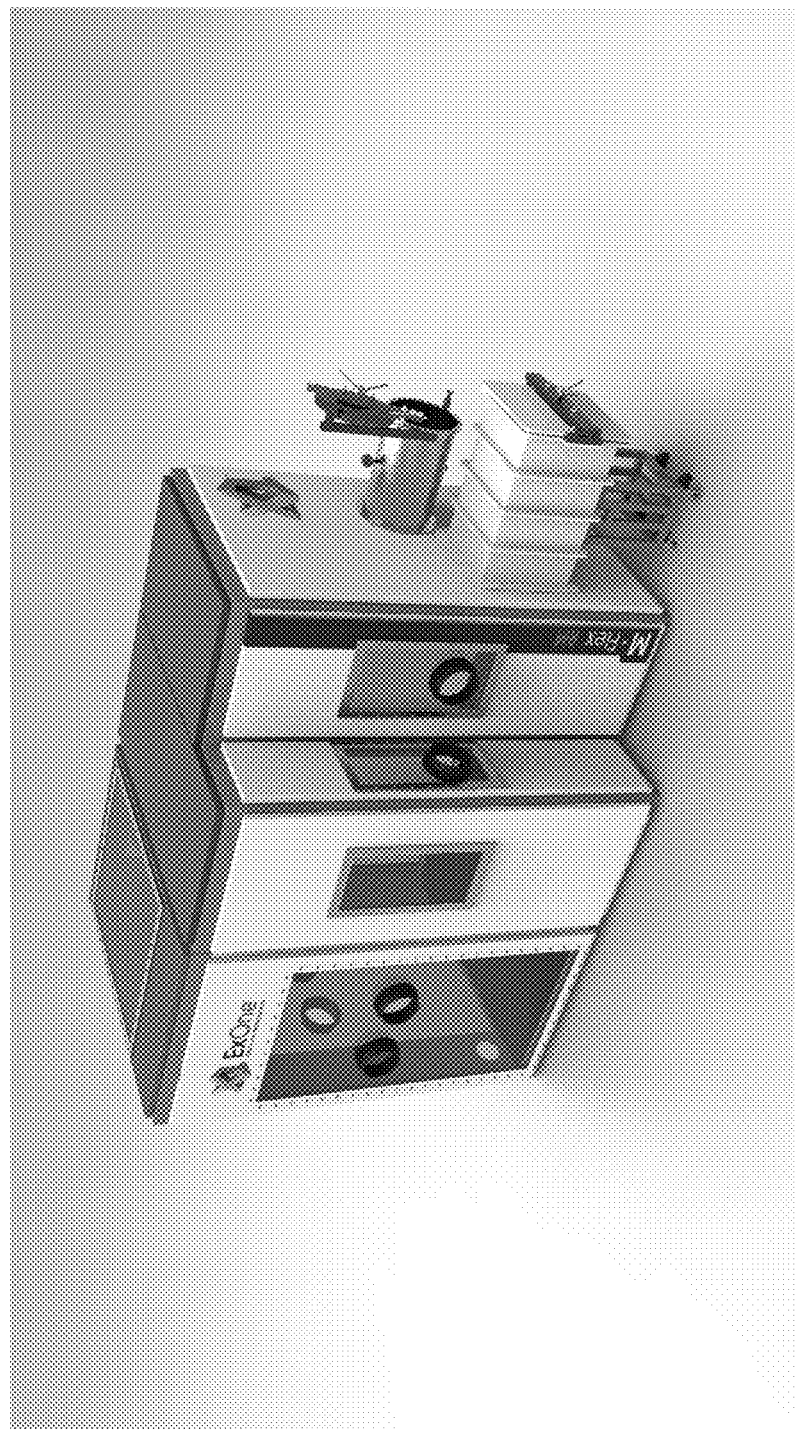
FIG. 24 is a schematic perspective front view of the environmental enclosure of FIG. 23 sans the additional information and depiction of the operator.
Figure 25:
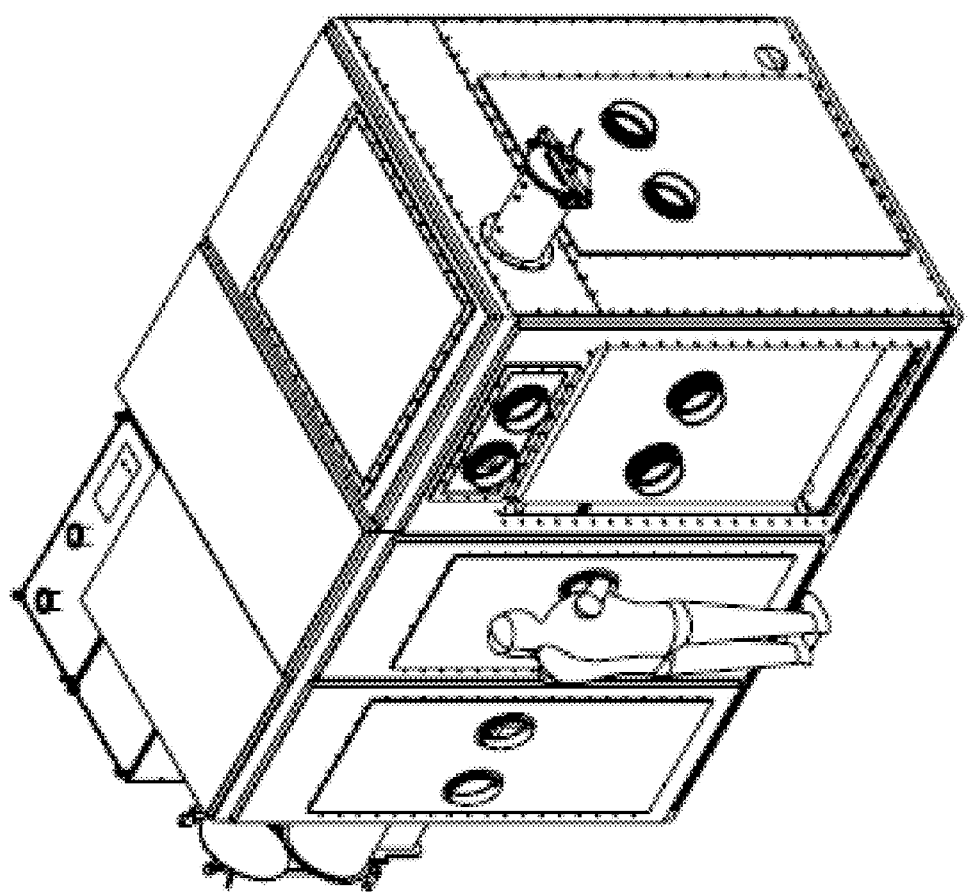
FIG. 25 is a schematic perspective top and rear view of an environmental enclosure sans gloves and a gas purification and handling unit enclosure according to another embodiment of the present invention depicting an operator working with his arms through two of the glove ports.
Figure 26:
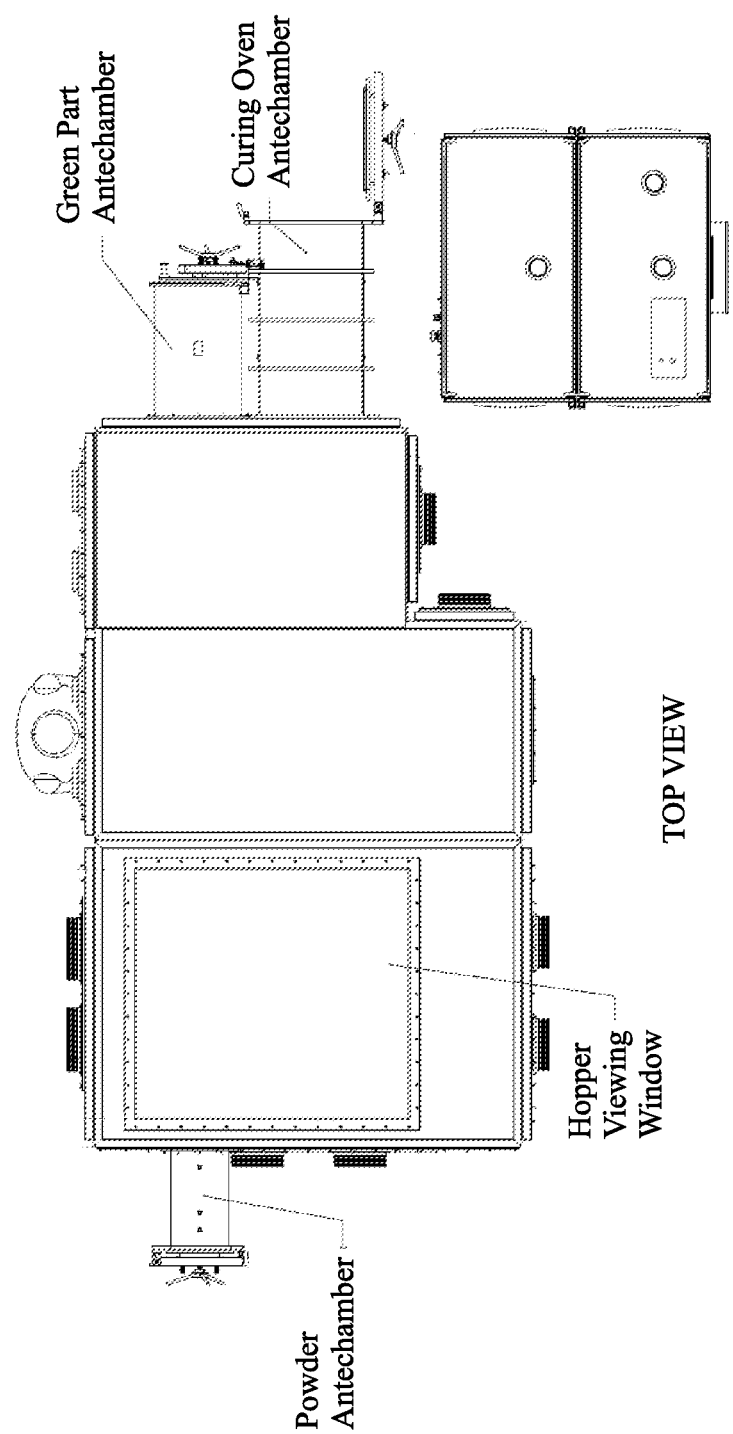
FIG. 26 is a schematic top view of the environmental enclosure and gas purification and handling unit enclosure of FIG. 25.
Figure 27:
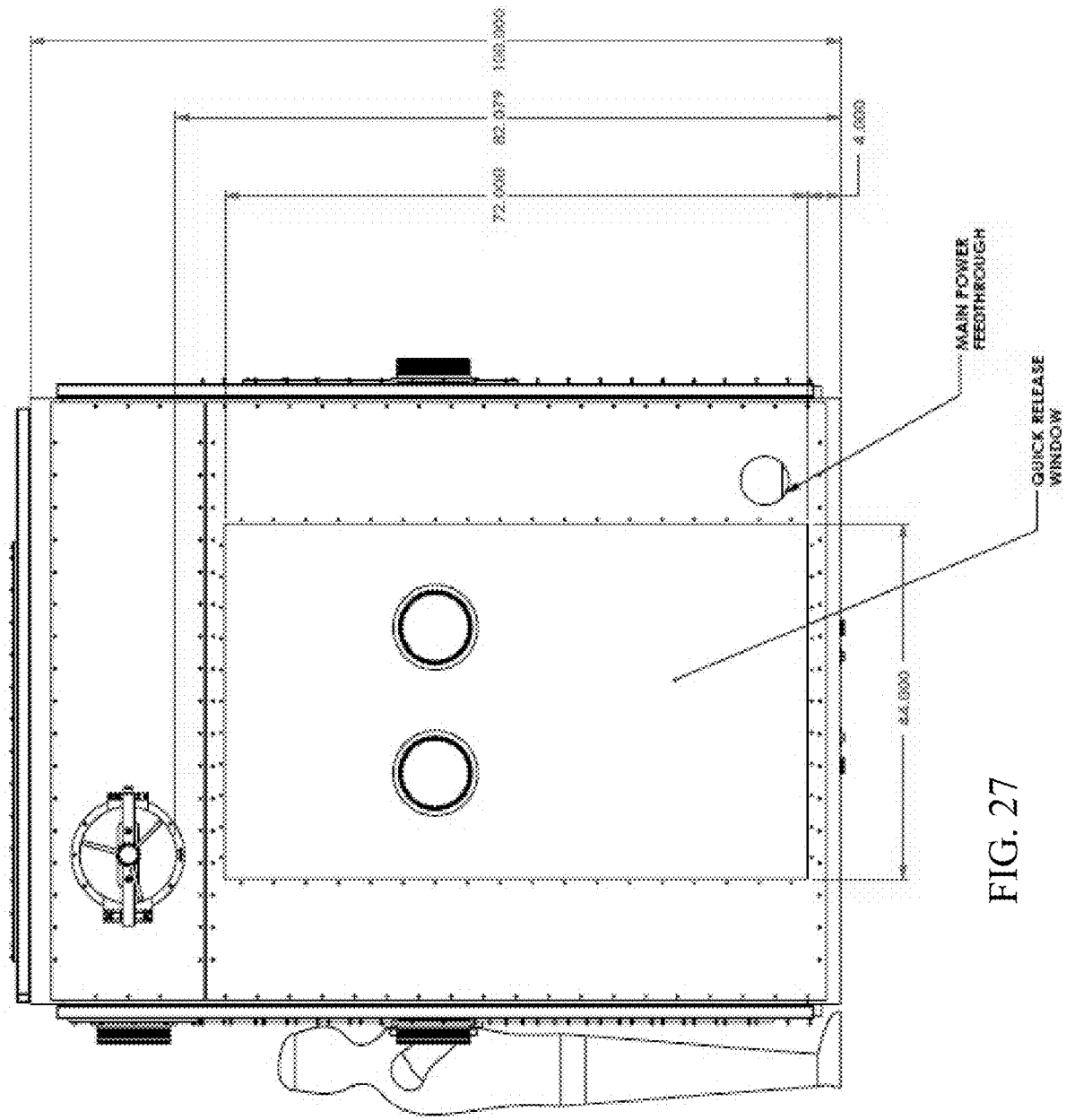
FIG. 27 is schematic left side view of the environmental enclosure of FIG. 25 depicting an operator at work.
Figure 28:
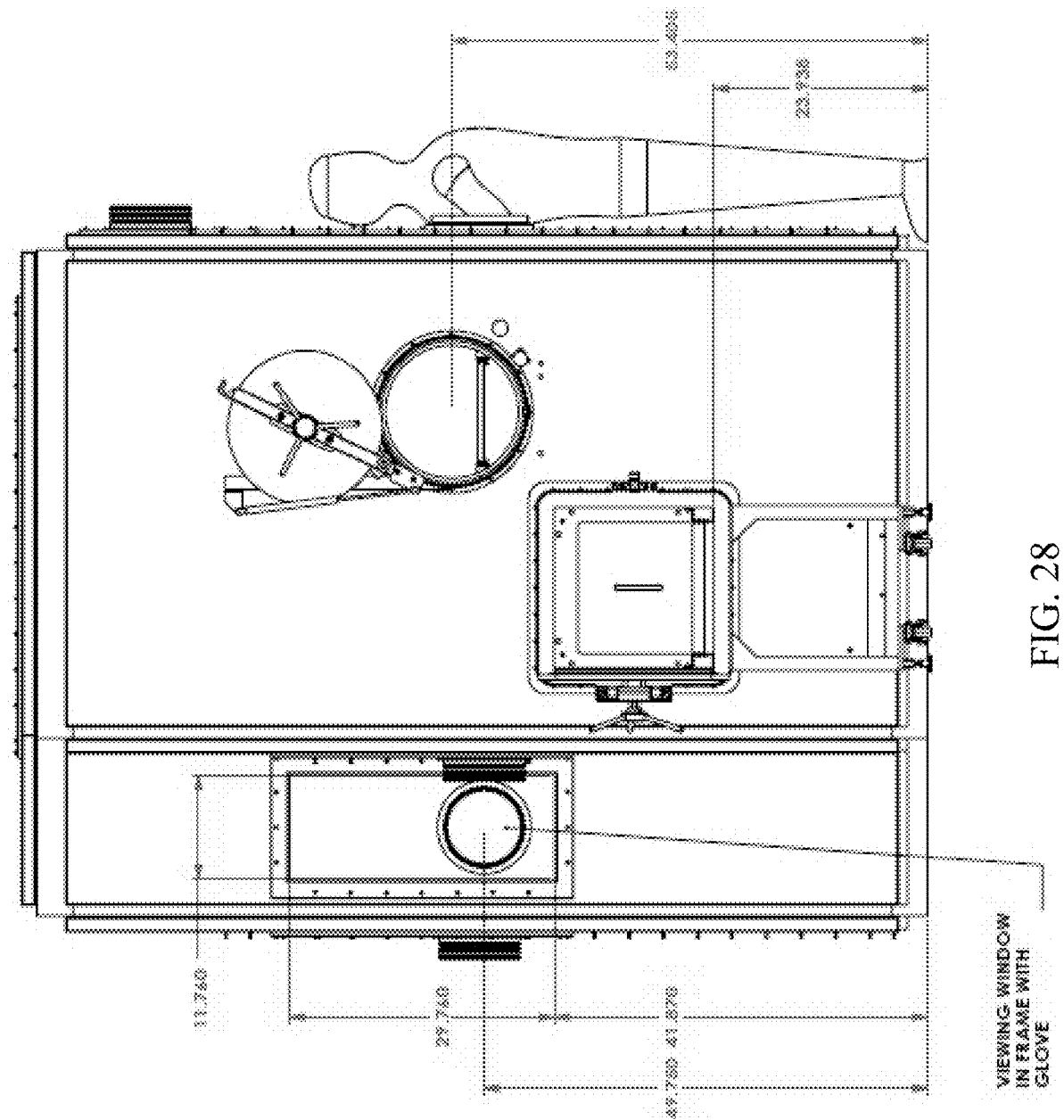
FIG. 28 is schematic right side view of the environmental enclosure of FIG. 25 depicting an operator at work.
Figure 29:
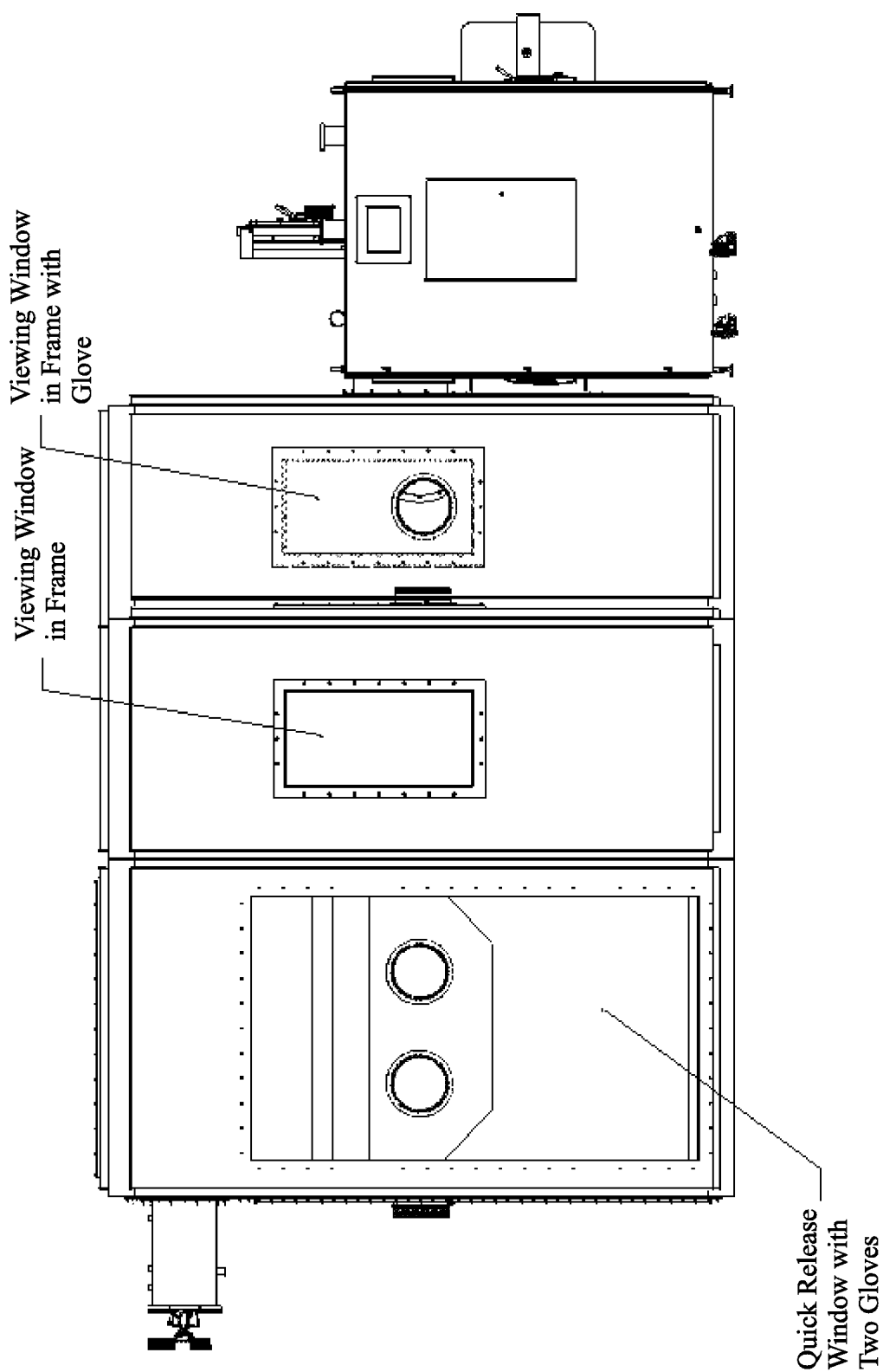
FIG. 29 is a schematic front view of the environmental enclosure and gas purification and handling unit enclosure of FIG. 25.
Figure 30:
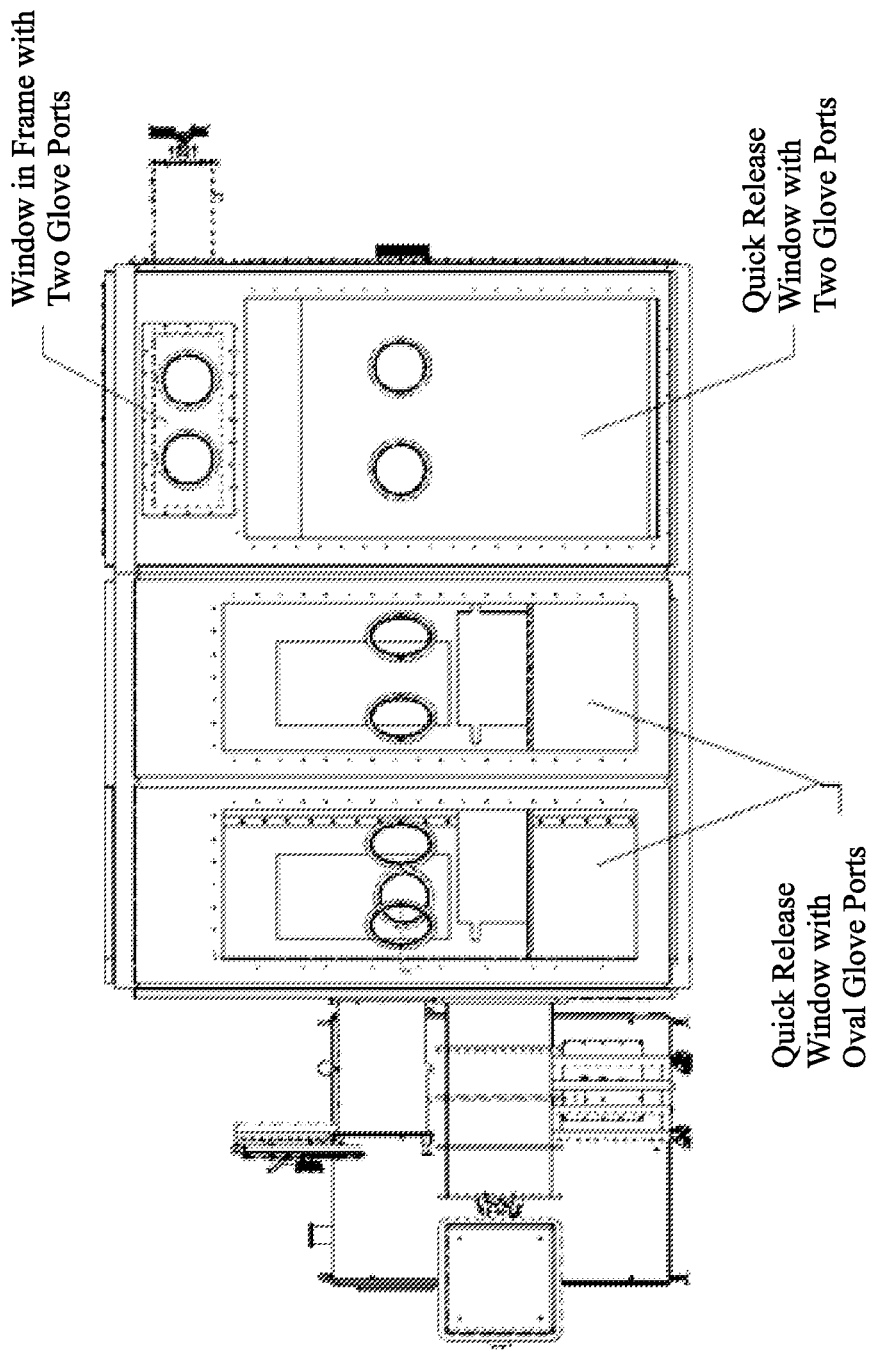
FIG. 30 is a schematic rear view of the environmental enclosure and gas purification and handling unit enclosure of FIG. 25 with the door open of the interlock enclosure designed to accommodate a curing device.

In this section, some preferred embodiments of the present invention are described in detail sufficient for one skilled in the art to practice the present invention without undue experimentation. It is to be understood, however, that the fact that a limited number of preferred embodiments are described herein does not in any way limit the scope of the present invention as set forth in the claims. It is to be understood that whenever a range of values is described herein or in the claims that the range includes the end points and every point therebetween as if each and every such point had been expressly described. Unless otherwise stated, the word "about" as used herein and in the claims is to be construed as meaning the normal measuring and/or fabrication limitations related to the value which the word "about" modifies. Unless expressly stated otherwise, the term "embodiment" is used herein to mean an embodiment of the present invention.

It is to be understood that the word "curing" as used herein in connection with three-dimensional printed articles is to be construed as "causing the binder to change in a way that results in the strengthening of the printed article or articles sufficiently to permit the printed article or articles to be removed from the powder bed without physical damage." In instances in which the binder includes a volatilizable solvent or carrier fluid, the curing will involve the removal of a portion or all of the solvent or carrier fluid from the printed article or articles. In some instances, the curing may include a chemical reaction in which one or more components of the binder is a reacting species. In some instances, the curing may involve polymerization and/or cross-linking of one or more components of the binder. In many instances, curing involves changing the temperature of the binder, most often by heating, but in some cases by cooling.

It is to be understood that although most of the drawings do not show gloves attached to the glove ports, embodiments include flexible, gas-tight gloves, e.g. rubber or some other elastomer, to be operably attached to each of the glove ports.

The term "reactive material" is to be construed herein as meaning any material which, when in the form of a build material, presents a fire or explosion hazard in air or undergoes a reaction with a constituent of air (including moisture) which would degrade its properties as a build material or the properties of the article that is to be build using that build material. Some examples of reactive materials are titanium, magnesium, aluminum and their alloys. Although the examples given in the previous sentence are all metals, the present invention includes all materials which fit the definition given in the previous sentence.

Embodiments of the inventive apparatus for three-dimensionally printing articles from reactive materials include an environmental enclosure that is capable of providing a sufficiently inert atmosphere for three-dimensionally printing, curing, and removing articles made by the three-dimensional printing process using a reactive material as a build material. In some embodiments, the environmental enclosure includes a three-dimensional printing device that has a removable build box.

In some embodiments the control of the gas environment within the environmental enclosure is done using a gas handling system that is external to the environmental enclosure, but in some embodiments this control is done from within the environmental enclosure. In some embodiments, the gas handling system also includes a gas purification system for removing impurities from the atmosphere of the environmental enclosure and then recirculating the cleaned gas. Such impurities include, without limitation, moisture, volatiles from the three-dimensional printing process, and suspended particulates.

The curing device may be any type of device that is compatible for curing the binder system used with the three-dimensional printing device. In some cases, the curing device is an oven for heating the printed articles and their surrounding powder bed to a temperature at which the binder cures. Preferably, the curing device is contained in an interlock, such as is shown in FIG. 1.

Figure 31:
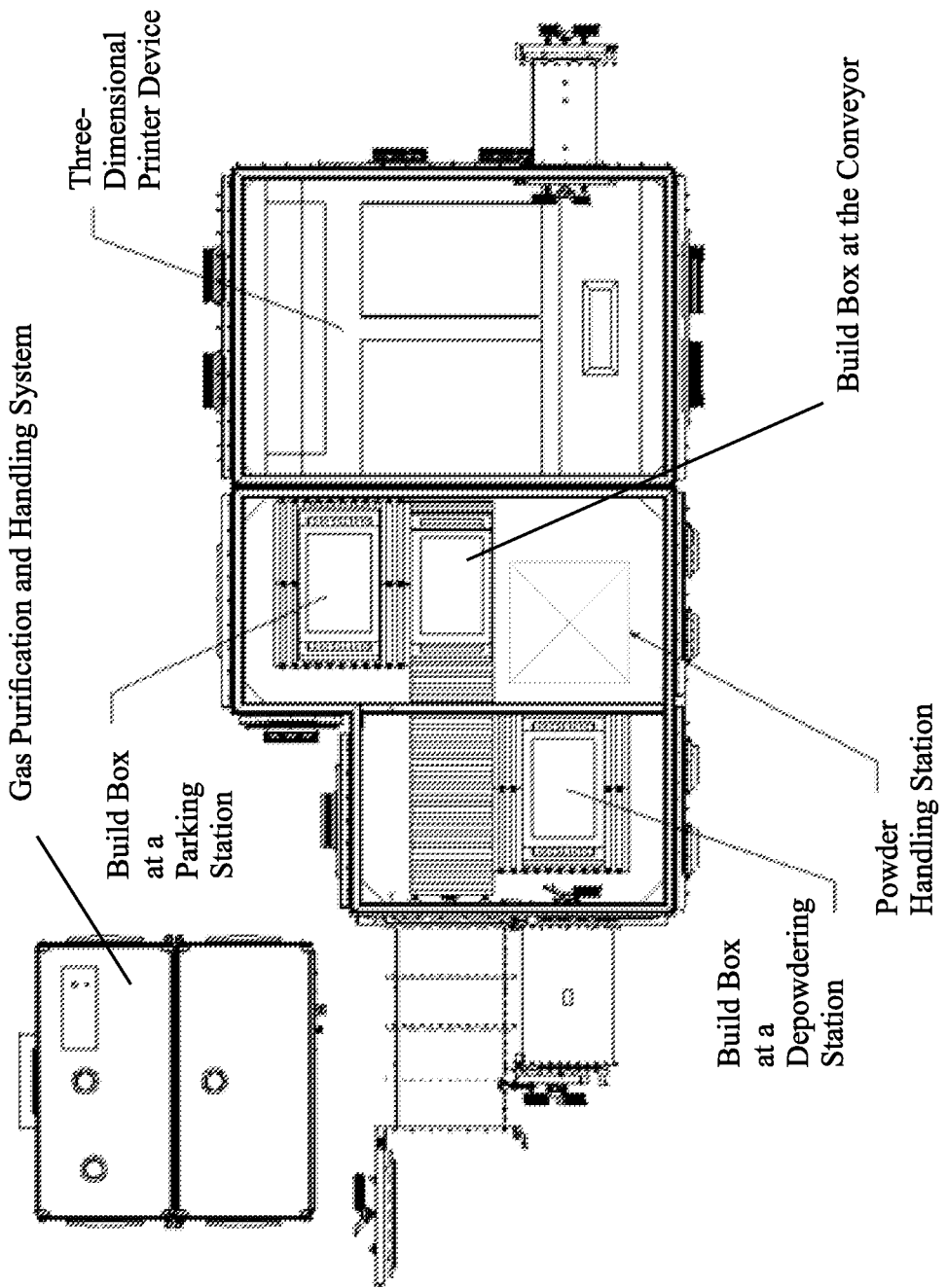
FIG. 31 is a schematic partial cut-away top view of the environmental enclosure and gas purification and handling unit enclosure of FIG. 25 with the roof of the environmental enclosure cut away to show the arrangement of equipment therein.
Figure 32:
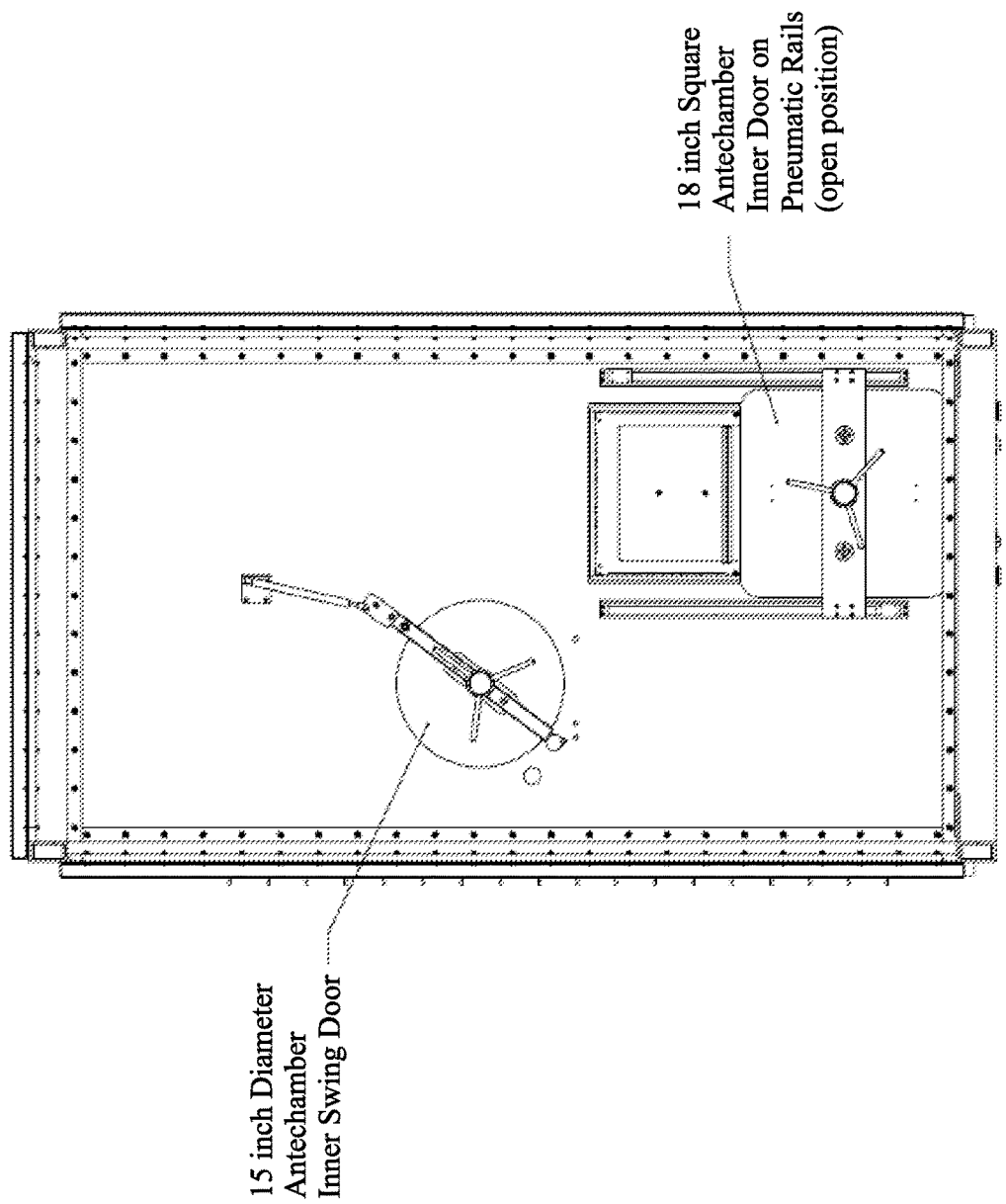
FIG. 32 is a schematic elevational view of an interior wall of the environmental enclosure of FIG. 25. The wall shown includes the closure doors for the interlock enclosure designed to accommodate a curing device and one of the interlocks which is designed for transferring materials into and out of the environmental enclosure.
Figure 33:
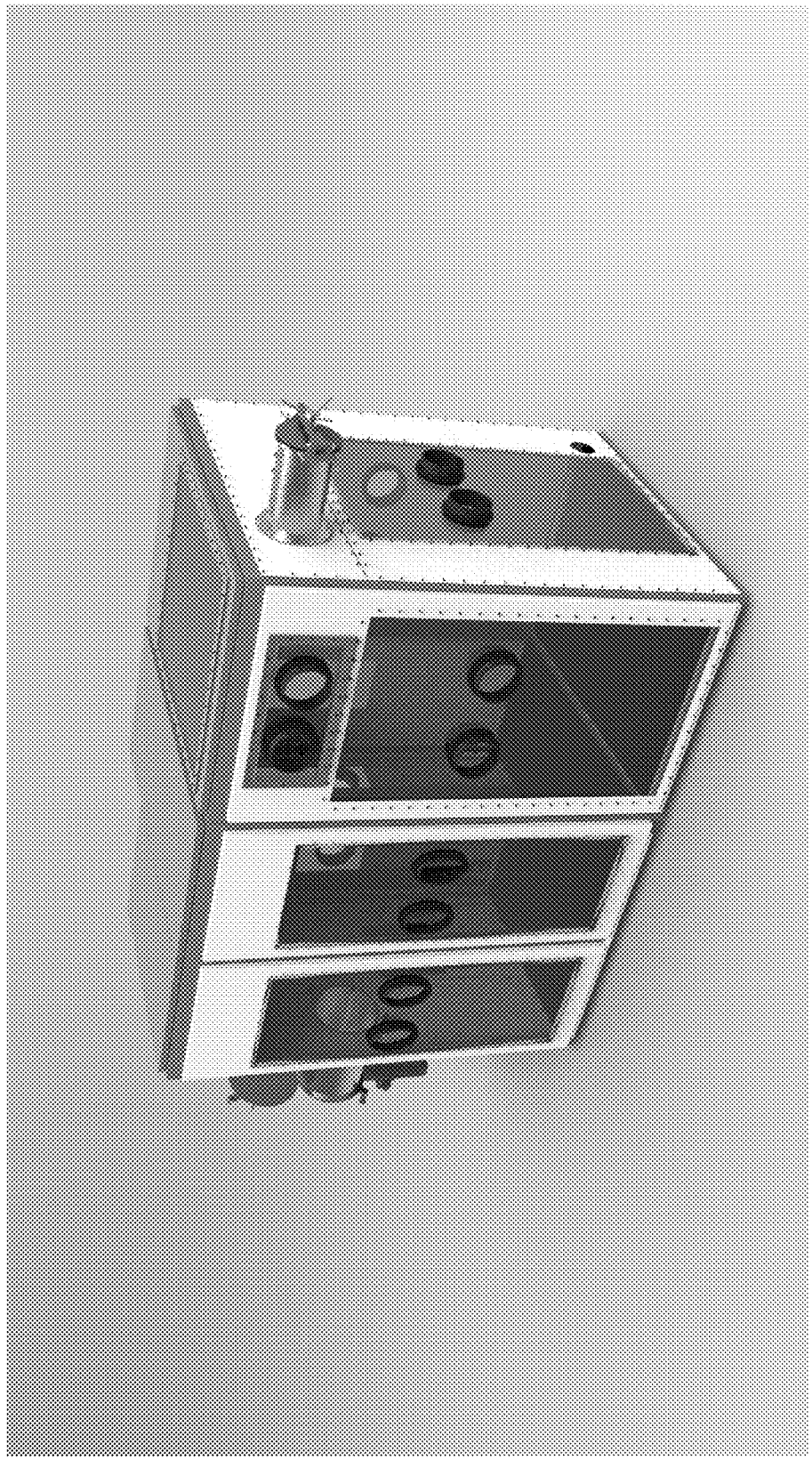
FIG. 33 is a schematic perspective rear view of the environmental enclosure of FIG. 1.
Figure 34:
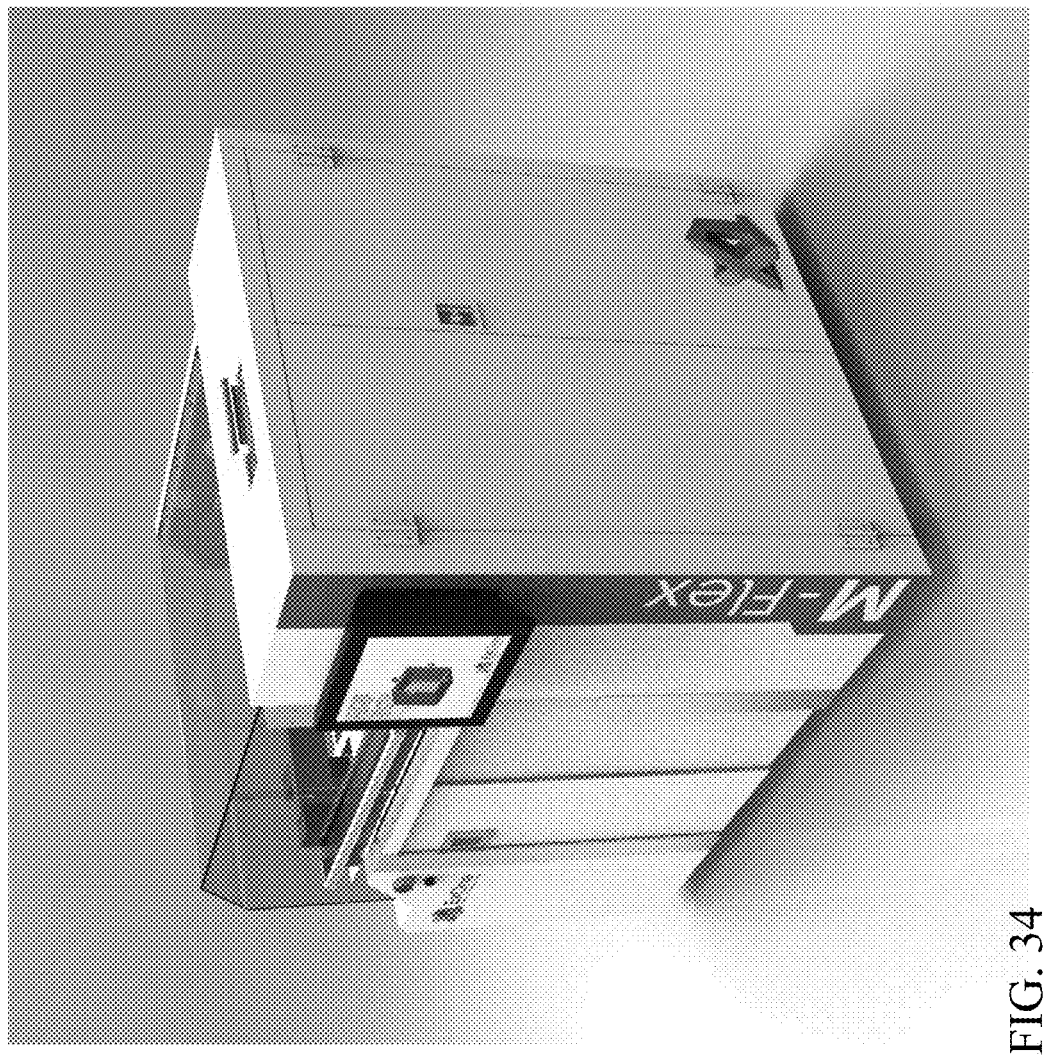
FIG. 34 is a schematic perspective view of a three-dimensional printer that is part of an embodiment of the present invention and which is usable within the environmental enclosure of FIG. 1.
Figure 34:
Figure 35:
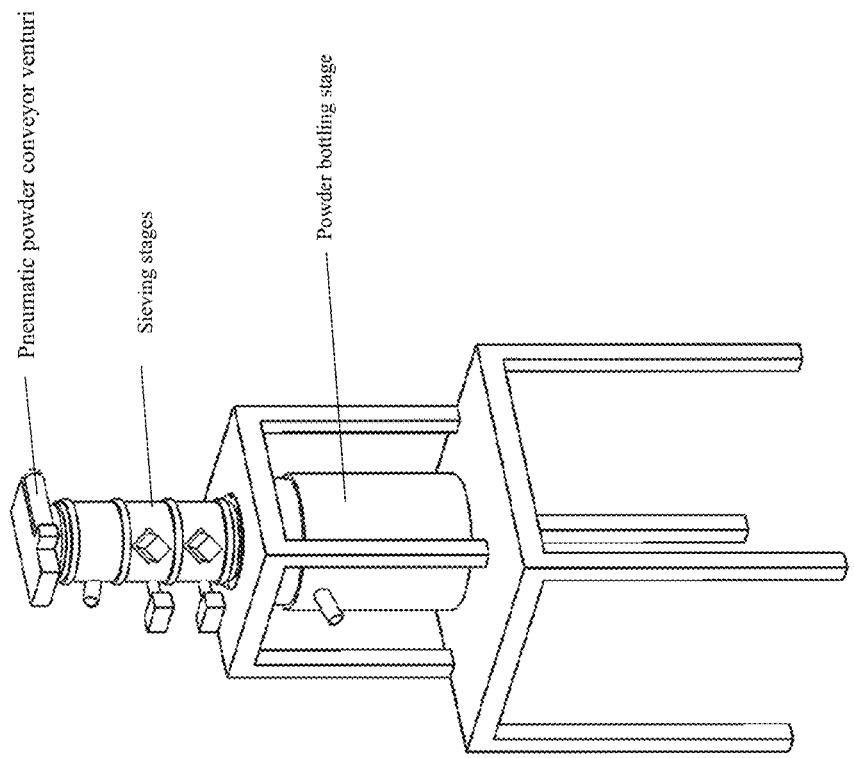
FIG. 35 is a schematic perspective view of a material processing station sans transfer tubing and supply lines in accordance with embodiments of the present invention and is suitable for use in the environmental enclosure of FIG. 1. The processing station includes a powder conveyor venturi for creating a vacuum to transfer powder via a hose (not shown) to the top of the sieving stages. After passing through the sieving stages, the powder goes into a bottle at the bottling stage.

Preferred embodiments include handling systems within the environmental enclosure for handling the build powder, the binder, and the build box or build boxes. A conveyor system is shown in FIG. 31 that permits rolling the build box in one direction and includes a lift mechanism for lifting the build box above the rollers and transporting the build box in directions which are orthogonal to the roller direction. Systems may be included within the environmental enclosure for moving the build powder by vacuum or pneumatic transfer. Provisions are made in embodiments to prevent the overpressurization and the underpressurization of the environmental enclosure and to permit the proper operation of three-dimensional printing devices which rely on pressure differential to control printing.

Materials are put into and out of the environmental enclosure via the various interlocks. The interlocks are designed to prevent contaminating the atmosphere of the environmental enclosure, e.g. by being adapted to be purged or evacuated and then backfilled with an inert gas.

In some embodiments, the reactive nature of the initial air atmosphere of environmental enclosure is eliminated by displacing the air with a heavy gas such as argon and/or by dilution with a non-reactive gas, i.e. non-reactive with respect to the particular reactive material that is being used as a build material.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. An apparatus comprising:
an environmental enclosure having an inner space, an interlock communicating between the inner space and an environment exterior to the environmental enclosure, and a glove port having a glove extending into the inner space, the environmental enclosure being adapted to maintain an inert atmosphere within the inner space;
a binder jet deposition three-dimensional printer having a removable build box;
a curing oven having a cavity adapted to receive the removable build box and to heat the removable build box to a preselected temperature; and
a conveyor adapted to transport the removable build box between the binder jet deposition three-dimensional printer and the curing oven;
wherein the binder jet deposition three-dimensional printer, the curing oven, and the conveyor are located within the inner space of the environmental enclosure.

2. The apparatus of claim 1 further comprising a gas handling system adapted to provide an inert gas to the inner space.

3. The apparatus of claim 2, wherein the gas handling system is adapted to withdraw gas from the inner space.

4. The apparatus of claim 3, wherein the gas handling system includes a gas purification system adapted to remove impurities from the gas withdrawn from the inner space to make a purified gas, the gas handling system being adapted to input the purified gas into the inner space.

5. The apparatus of claim 1 further comprising a depowdering station located within the inner space, wherein the conveyor is adapted to transport the build box between the depowdering station and at least one of the curing oven and the binder jet deposition three-dimensional printer.

* * * * *